United States Patent
McAllister

(10) Patent No.: US 10,596,869 B2
(45) Date of Patent: Mar. 24, 2020

(54) BALL ASSEMBLY FOR MEASURING TONGUE WEIGHT OF A TRAILER

(71) Applicant: Weigh Safe, LLC, Lindon, UT (US)

(72) Inventor: Kevin McAllister, American Fork, UT (US)

(73) Assignee: Weigh Safe, LLC, Lindon, UT (US)

(*) Notice: Subject to any disclaimer, the term of this patent is extended or adjusted under 35 U.S.C. 154(b) by 0 days.

(21) Appl. No.: 15/493,068

(22) Filed: Apr. 20, 2017

(65) Prior Publication Data
US 2017/0334255 A1 Nov. 23, 2017

Related U.S. Application Data

(63) Continuation-in-part of application No. PCT/US2016/021266, filed on Mar. 7, 2016, which is a continuation of application No. 14/639,987, filed on Mar. 5, 2015, now Pat. No. 9,643,462, application No. 15/493,068, which is a continuation-in-part of application No. 14/639,987, filed on Mar. 5, 2015, now Pat. No. 9,643,462, which is a continuation-in-part of application No. 14/284,273, filed on May 21, 2014, now Pat. No. 9,327,566.

(60) Provisional application No. 62/325,407, filed on Apr. 20, 2016, provisional application No. 62/249,730, filed on Nov. 2, 2015, provisional application No. 61/826,247, filed on May 22, 2013, provisional application No. 61/928,166, filed on Jan. 16, 2014, provisional application No. 61/948,487, filed on Mar.
(Continued)

(51) Int. Cl.
*B60D 1/06* (2006.01)
*B60D 1/24* (2006.01)
*G01G 19/02* (2006.01)
*G01L 5/13* (2006.01)
*G01G 5/00* (2006.01)

(52) U.S. Cl.
CPC .............. *B60D 1/248* (2013.01); *B60D 1/06* (2013.01); *G01G 5/006* (2013.01); *G01G 19/02* (2013.01); *G01L 5/136* (2013.01)

(58) Field of Classification Search
CPC .......... B60D 1/248; B60D 1/06; G01G 5/006; G01G 19/02; G01L 5/136
See application file for complete search history.

(56) References Cited

U.S. PATENT DOCUMENTS 245,201 A 8/1881 Mills
665,017 A 1/1901 Klein
(Continued)

FOREIGN PATENT DOCUMENTS

DE 3612053 A1 10/1987
DE 10211572 A1 10/2003
(Continued)

*Primary Examiner* — Joseph M Rocca
*Assistant Examiner* — Marlon A Arce
(74) *Attorney, Agent, or Firm* — Thorpe North and Western, LLP; David W. Osborne

(57) ABSTRACT

A ball assembly for attachment to a ball mount is described. The ball assembly can include a ball post that is securable to a ball mount. A hitch ball is slidably coupled to the ball post at a ball end of the ball post. A load gauge is disposed at the gauge end of the ball post. A load transfer element is operably associated with both the hitch ball and the load gauge so as to cause a load measurement to display on the load gauge based upon a load applied to the hitch ball.

20 Claims, 18 Drawing Sheets

Related U.S. Application Data 5, 2014, provisional application No. 61/948,456, filed on Mar. 5, 2014.

(56) References Cited

U.S. PATENT DOCUMENTS

| | | | |
|---|---|---|---|
| 2,363,307 A | | 11/1944 | Florschutz |
| 2,500,686 A | | 3/1950 | Jontz |
| 3,695,213 A | | 10/1972 | Littlefield |
| 3,700,053 A | | 10/1972 | Glissendorf |
| 3,797,594 A | | 3/1974 | Chaffee |
| 4,056,155 A | | 11/1977 | Wahl |
| 4,239,253 A | | 12/1980 | Golze |
| 4,286,669 A | * | 9/1981 | Lasoen .................. G01L 5/136 172/7 |
| 4,319,766 A | | 3/1982 | Corteg et al. |
| 4,522,421 A | | 6/1985 | Vance |
| 4,627,633 A | | 12/1986 | Gehman et al. |
| 4,996,770 A | | 3/1991 | McCracken |
| 5,040,817 A | | 8/1991 | Dunn |
| 5,116,072 A | | 5/1992 | Swenson |
| 5,286,094 A | | 2/1994 | Milner |
| 5,290,057 A | | 3/1994 | Pellerito |
| 5,890,726 A | | 4/1999 | McCoy et al. |
| 6,053,521 A | | 4/2000 | Schertler |
| 6,253,626 B1 | | 7/2001 | Shoberg et al. |
| 6,270,107 B1 | | 8/2001 | Stoughton |
| 6,494,478 B1 | | 12/2002 | MacKarvich |
| 6,629,701 B1 | | 10/2003 | Colibert |
| 6,722,684 B1 | * | 4/2004 | McAllister ............... B60D 1/06 177/146 |
| 6,829,943 B2 | | 12/2004 | Weyand et al. |
| 7,960,659 B2 | | 6/2011 | Cleary |
| 7,963,545 B2 | * | 6/2011 | Coy ......................... B60D 1/52 280/491.5 |
| 8,033,563 B2 | | 10/2011 | Good |
| 8,226,107 B2 | | 7/2012 | Columbia |
| 8,276,932 B2 | | 10/2012 | Columbia |
| 8,371,603 B2 | | 2/2013 | Columbia |
| 8,376,387 B2 | | 2/2013 | Columbia |
| 8,380,390 B2 | | 2/2013 | Sy et al. |
| 8,534,695 B2 | | 9/2013 | Columbia |
| 8,840,130 B2 | | 9/2014 | Columbia |
| 8,939,462 B2 | | 1/2015 | Adamczyk et al. |
| 9,004,523 B2 | | 4/2015 | Scharf |
| 9,327,566 B2 | | 5/2016 | McAllister |
| 2001/0045725 A1 | | 11/2001 | McCoy et al. |
| 2002/0140207 A1 | | 10/2002 | McCoy et al. |
| 2005/0283296 A1 | | 12/2005 | Viaud |
| 2006/0032679 A1 | | 2/2006 | Wilson et al. |
| 2006/0290102 A1 | * | 12/2006 | VanBuskirk, Jr. ....... B60D 1/58 280/511 |
| 2009/0302574 A1 | | 12/2009 | Columbia |
| 2011/0259651 A1 | | 10/2011 | Cleary |
| 2012/0024081 A1 | | 2/2012 | Baker |
| 2012/0217726 A1 | | 8/2012 | Vortmeyer et al. |
| 2013/0038436 A1 | | 2/2013 | Brey et al. |
| 2013/0080078 A1 | | 3/2013 | Wirthlin |
| 2013/0253814 A1 | | 9/2013 | Wirthlin |
| 2014/0110918 A1 | | 4/2014 | McCoy |
| 2016/0231165 A1 | * | 8/2016 | Fredrickson ............ B60L 1/006 |

FOREIGN PATENT DOCUMENTS

| | | |
|---|---|---|
| DE | 202011051374 U1 | 9/2011 |
| DE | 202011105552 U1 | 9/2012 |
| DE | 102011078329 A1 | 1/2013 |
| EP | 2363307 A2 | 9/2011 |
| WO | WO 2007/002278 A2 | 1/2007 |

* cited by examiner

BALL ASSEMBLY FOR MEASURING TONGUE WEIGHT OF A TRAILER

PRIORITY DATA

This application claims the benefit of U.S. Provisional Application Ser. No. 62/325,407, filed on Apr. 20, 2016, which is incorporated by reference. This application is also a continuation-in-part of PCT Application Serial No. PCT/US16/21266, filed on Mar. 7, 2016, which claims priority to U.S. patent application Ser. No. 14/639,987 filed on Mar. 5, 2015 and the benefit of U.S. Provisional Application Ser. No. 62/249,730 filed on Nov. 2, 2015, each of which is incorporated by reference. This application is also a continuation-in-part of U.S. patent application Ser. No. 14/639,987 filed on Mar. 5, 2015, which is a continuation-in-part of U.S. patent application Ser. No. 14/284,273, filed on May 21, 2014, which claims the benefit of U.S. Provisional Patent Application Ser. Nos. 61/826,247, filed on May 22, 2013, 61/928,166, filed on Jan. 16, 2014, 61/948,487, filed on Mar. 5, 2014, and 61/948,456, filed Mar. 5, 2014, each of which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the tongue weight or static downward force that the trailer applies to the hitch of the tow vehicle. If the tongue of the trailer does not apply enough downward force to the hitch, a dangerous condition called trailer sway could result. If the tongue of the trailer applies too much downward force to the hitch, then the rear tires of the tow vehicle can be overloaded, thus pushing the rear of the vehicle around and compromising steering and/or braking of the tow vehicle. A generally acceptable tongue weight for any trailer is somewhere between 9% and 15% of the gross trailer weight (GTW).

SUMMARY OF THE INVENTION

Ball assemblies for attachment to a ball mount are provided. In one embodiment, the ball assembly can include a ball post that is securable to a ball mount, a hitch ball slidably coupled to the ball post at a ball end of the ball post, a load gauge disposed at a gauge end of the ball post, and a load transfer element operably associated with both the hitch ball and the load gauge so as to cause a load measurement to display on the load gauge based upon a load applied to the hitch ball.

In other embodiments, there are provided methods of measuring tongue weight of a trailer. One exemplary method can include engaging a tongue of a trailer with a ball assembly as described herein.

In yet other embodiments there are provided, removable hitch balls that can be changed quickly and conveniently to accommodate the size needs of various trailer tongues. One exemplary removable hitch ball can include a hitch ball body that is removably attachable to a ball end of a ball post.

DETAILED DESCRIPTION OF THE INVENTION

Definitions

Figure 1:
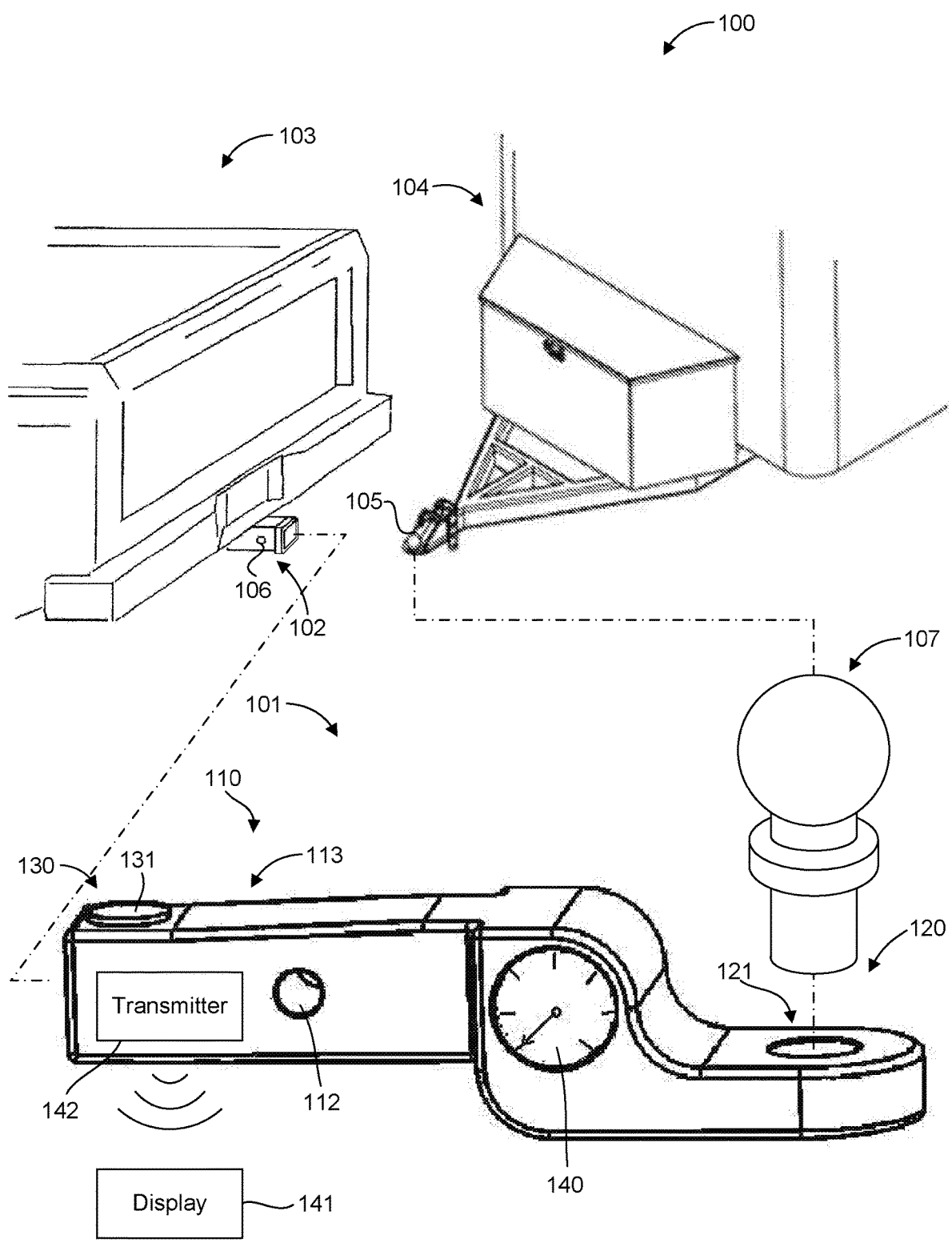
FIG. 1 illustrates a trailer hitch system for measuring tongue weight of a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

With reference to FIG. 1, illustrated is a trailer hitch system 100 for measuring tongue weight of a trailer, in accordance with an example of the present disclosure. The system 100 can include a hitch receiver 102 associated with a vehicle 103 and a trailer 104 having a tongue 105 for coupling the trailer to the vehicle. The system 100 can also include a ball mount 101 configured to measure tongue weight of the trailer 104.

The ball mount 101 can include a hitch portion 110 for interfacing with the hitch receiver 102. The hitch receiver 102 can be any typical hitch receiver, such as a standard 2½", 2", or 1¼" size square hitch receiver. The hitch portion can include a hole 112 or other suitable feature to facilitate securing the ball mount 101 to the hitch receiver 102, such as with a pin or threaded fastener through the hole 102 of the ball mount 101 and a hole 106 of the hitch receiver 102. The ball mount 101 can also include a ball portion 120 for interfacing with a hitch ball 107 configured to couple with the tongue 105 of the trailer 104. The ball portion 120 can include a coupling feature 121 configured to couple to the hitch ball 107 in any suitable manner, such as with a threaded coupling, a clearance hole for a threaded fastener, or other removable coupling. In one aspect, the hitch ball 107 can be coupled to the ball portion 120 with a weld or other a permanent coupling.

The ball mount 101 can also include a load measurement device 130 associated with the hitch portion 110. The load measurement device 130 can be configured to determine a magnitude of the downward force on the hitch ball 107 and, therefore, the tongue weight of the trailer 104. It should be recognized that any suitable load measurement device can be utilized. For example, the load measurement device 130 can comprise a load cell or transducer, such as a strain gage load cell, a mechanical load cell, a hydraulic load cell, and/or a pneumatic load cell, or any other suitable type of load cell. In one aspect, the load measurement device 130 can comprise an interface portion 131 configured to interface with the hitch receiver 102. For example, as shown in the figure, the interface portion 131 can be located at a top side 113 of the hitch portion 110 to interface with an upper interior surface of the hitch receiver 102.

In addition, the ball mount 101 can include a display 140 configured to indicate the magnitude of the downward force, as determined by the load measurement device 130. In one aspect, the display 140 can be associated with the ball portion 120, as shown in the figure. The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be mechanically, electrically, hydraulically, and/or pneumatically coupled to the load measurement device 130. The load measurement device 130 and/or the display 140 can therefore include any suitable mechanical, electrical, hydraulic, and/or pneumatic device or mechanism that can facilitate the determination and/or display of the magnitude of the load on the hitch ball 107. For example, the load measurement device 130 and/or the display 140 can include a processor and/or memory to determine the magnitude of the load on the hitch ball 107. In one aspect, a mobile device, such as a smartphone or a tablet, can include a processor and/or memory used to determine the magnitude of the load on the hitch ball 107, such as by executing an application. In another aspect, the display 140 can be calibrated to indicate the magnitude of the load on the hitch ball 107, based on mechanical, electrical, hydraulic, and/or pneumatic input from the load measurement device 130. In a particular aspect, therefore, the display 140 can be integral with the load measurement device 130 in determining the magnitude of the load on the hitch ball 107.

The ball mount can also include a transmitter 142 such that load data pertaining to the magnitude of the downward force on the hitch ball 107 can be wired or wirelessly transmitted to the display 140. In one aspect, the transmitter can transmit load data to a location remote from the ball hitch, such as to a remote display 141. For example, the display 141 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display 141 can comprise a screen of a mobile device, such as a smartphone or a tablet. Thus, the load data can be communicated to any suitable location, in or out of the vehicle. It should therefore be recognized that the display 140, 141 can be disposed in any suitable location and can be in communication with the load measurement device 130 via any suitable means. In one aspect, the load measurement device 130, the display 140, and/or the transmitter 150, or any other related item or device, such as a processor, memory, a battery, or a RF receiver, can be located in or on the ball mount 101.

Although the trailer hitch system 100 includes what is generally referred to as a "ball mount" throughout the present disclosure for coupling with a trailer, it should be recognized that the trailer hitch system can include any suitable form of coupling with a trailer, such as a lunette ring and pintle hook. Aspects of the present disclosure that facilitate measuring tongue weight of a trailer by utilizing an interaction between a receiver hitch and a hitch portion can be incorporated into such coupling arrangements.

Figure 2:
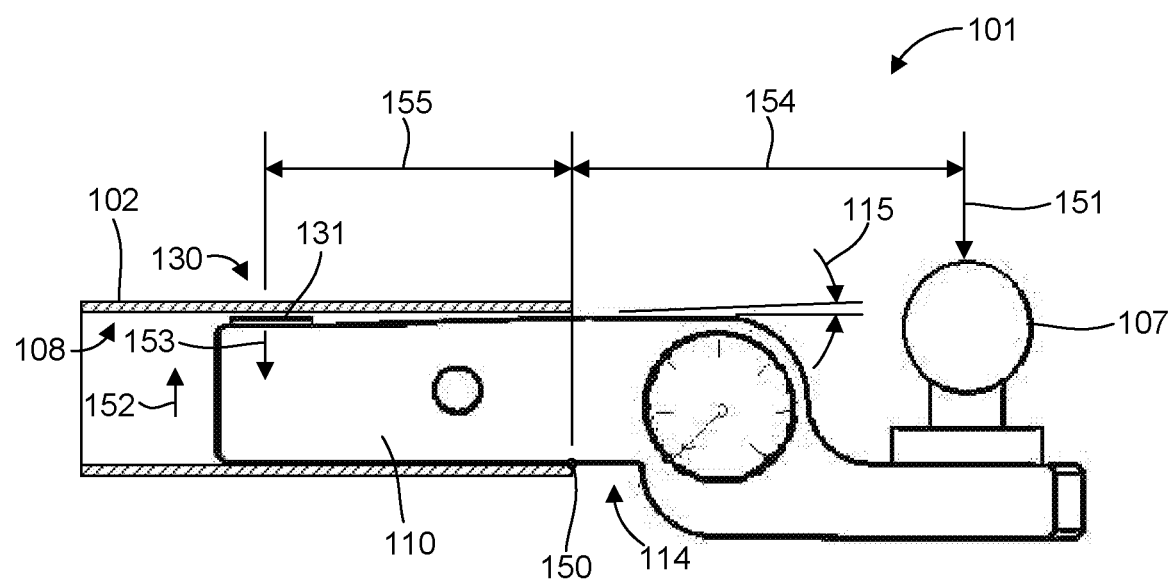
FIG. 2 is a detailed schematic illustration of a ball mount and a hitch receiver of the trailer hitch system of FIG. 1.

FIG. 2 is a schematic illustration of the ball mount 101 of FIG. 1 inserted into the hitch receiver 102. As shown in FIG. 2, the ball mount 101 is configured to pivot relative to the hitch receiver 102 about a fulcrum 150 in response to a downward force 151 on the hitch ball 107. The fulcrum 150 can be defined by an interface between a bottom side 114 of the hitch portion 110 and the hitch receiver 102, such as a lower interior surface or outer edge of an opening. The pivoting of the ball mount 101 about the fulcrum 150 in direction 152 can cause the hitch portion 110 to move upward. The hitch receiver 102, such as an upper interior surface 108, resists rotation of the hitch portion 110 in direction 152 about the fulcrum 150 by exerting a reaction force 153 on the hitch portion 110, which induces a load, such as a force and/or moment, on the hitch portion 110.

In one aspect, the load measurement device 130 can be configured to determine a magnitude of the downward force 151 on the hitch ball 107 based on the load or a portion or a component of the load on the hitch portion 110. For example, the load measurement device 130 can determine a magnitude of the force 153 exerted on the interface portion 131 of the load measurement device 130 by the hitch receiver 102. The magnitude of the downward force 151 on the hitch ball 107 can be determined using the magnitude of the force 153, a distance 154 between the hitch ball 107 and the fulcrum 150, and a distance 155 between the interface portion 131 of the load measurement device 130 and the fulcrum 150. The downward force 151 on the hitch ball 107 can therefore be determined using an interaction or interface between the hitch portion 110 of the ball mount 101 and the hitch receiver 102. It should be recognized that the interface portion 131 of the load measurement device 130 can be located at any suitable location on the hitch portion 110 and configured to facilitate contact of the interface portion 131 and the hitch receiver 102 at any suitable location.

In one aspect, the hitch portion 110 can be configured to facilitate the pivoting action about the fulcrum 150, such as by having a taper at an angle 115 that tapers narrower toward the location of the interface portion 131 of the load measurement device 130 to provide a rotational range of motion for the hitch portion 110 within the hitch receiver 102.

Figure 3:
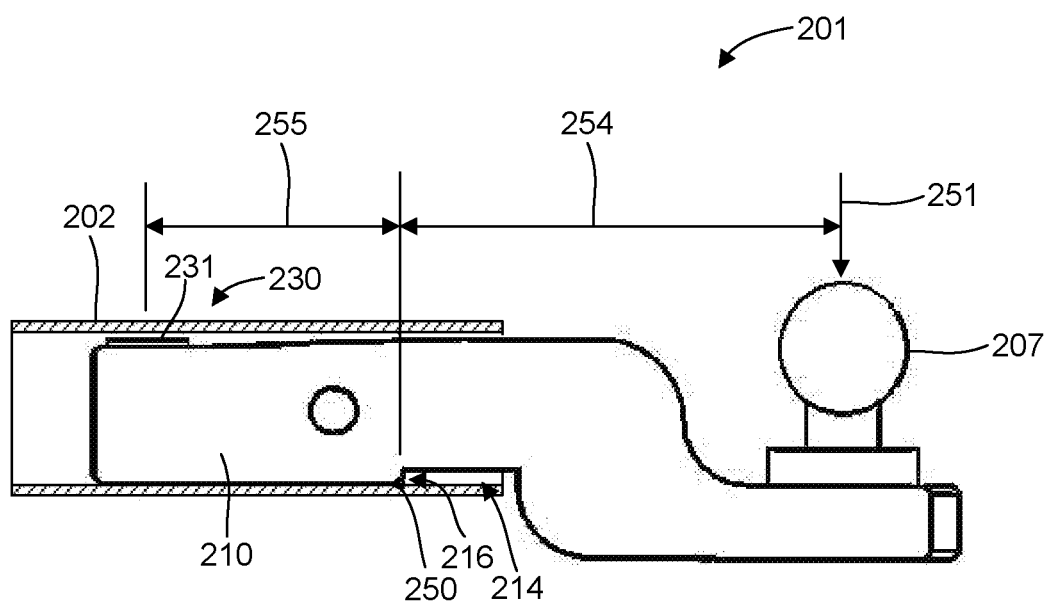
FIG. 3 illustrates a ball mount for measuring tongue weight of a trailer, in accordance with another example of the present disclosure.

FIG. 3 is a schematic illustration of a ball mount 201 for measuring tongue weight of a trailer, in accordance with another example of the present disclosure, shown inserted into a hitch receiver 202. The ball mount 201 includes some similarities with the ball mount 101 of FIGS. 1 and 2. For example, the ball mount 201 includes a hitch portion 210 for interfacing with the hitch receiver 202 and a load measurement device 230 associated with the hitch portion 210 and configured to determine a magnitude of a downward force 251 on a hitch ball 207.

In this case, the hitch portion 210 includes a fulcrum feature 216 on a bottom side 214 of the hitch portion 210 configured to form a fulcrum 250 by interfacing with the hitch receiver 202. The fulcrum feature 216 can be defined by a protrusion from the hitch portion 210 to ensure contact by the fulcrum feature 216 with the hitch receiver 202 such that the ball mount 201 rotates about the fulcrum feature 216. For example, the hitch portion 210 can be locally recessed on the bottom side 214 to form the fulcrum feature 216 and ensure that the bottom side 214 of the hitch portion 210 provides unencumbered rotation of the ball mount 201 about the fulcrum feature 216 when engaged with the hitch receiver 202. In one aspect, the fulcrum feature 216 can be located at a known distance 254 from the hitch ball 207 and at a known distance 255 from an interface portion 231 of the load measurement device 230. The fulcrum feature 216 can therefore ensure that the fulcrum 250 formed by the interface between the hitch portion 210 and the hitch receiver 202 is at a consistent and known location relative to the interface portion 231 and the hitch ball 207, regardless of how far into the hitch receiver 202 the hitch portion 210 is inserted (so long as the interface portion 231 and the fulcrum feature 216 are within the hitch receiver 202), which can ensure accurate determinations of the downward force 251 on the hitch ball 207.

Figure 4:
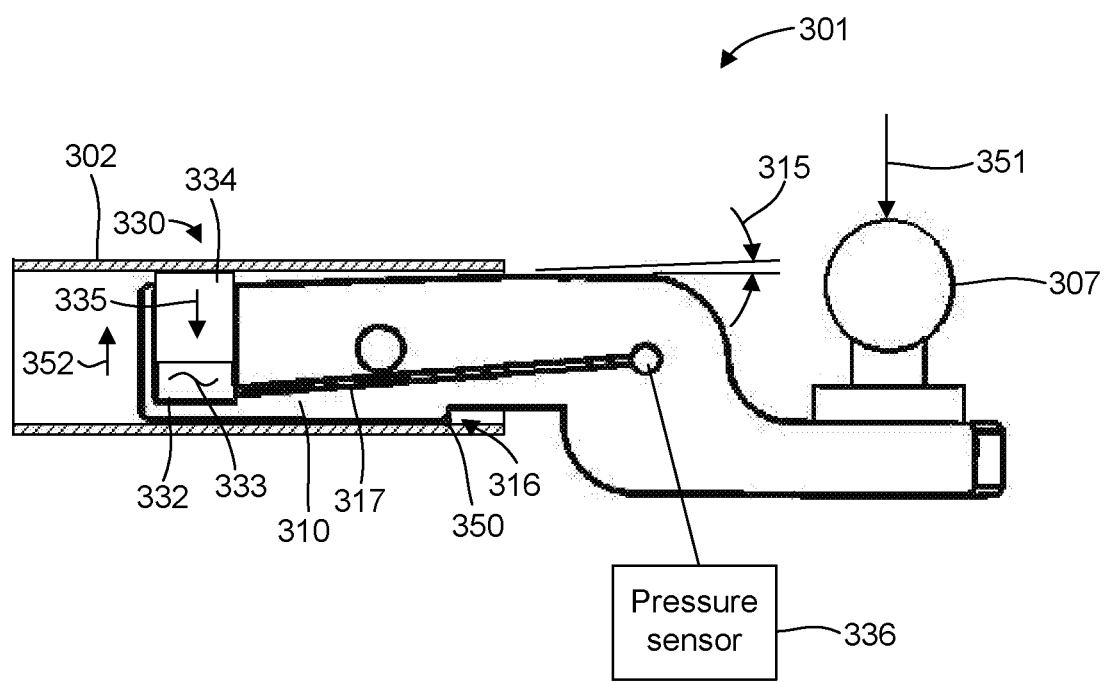
FIG. 4 illustrates a ball mount for measuring tongue weight of a trailer, in accordance with yet another example of the present disclosure.

FIG. 4 is a schematic illustration of a ball mount 301 for measuring tongue weight of a trailer, in accordance with yet another example of the present disclosure, shown inserted into a hitch receiver 302. The ball mount 301 includes some similarities with other ball mounts disclosed herein. For example, the ball mount 301 includes a hitch portion 310 for interfacing with the hitch receiver 302 and a load measurement device 330 associated with the hitch portion 310 and configured to determine a magnitude of a downward force 351 on a hitch ball 307.

In this case, the load measurement device 330 can include a reservoir 332 associated with the hitch portion 310, as well as a fluid 333 and a piston 334, which can be disposed in the reservoir 332. The piston 334 can be configured to interface with the hitch receiver 302 and affect a pressure of the fluid 333 as a result of a downward force 351 on the hitch ball 307. For example, upon application of the downward force 351, the ball mount 301 can pivot on the hitch receiver 302 about a fulcrum 350 formed by a fulcrum feature 316. The pivoting of the ball mount 301 in direction 352 about the fulcrum 350 can cause the hitch portion 310 to move upward in direction. This can cause the piston 334 to contact an upper interior surface or wall of the hitch receiver 302, which can force the piston 334 to move in direction 335 within the reservoir 332, causing a pressure change in the fluid 333. In one aspect, the hitch portion 310 can be configured to facilitate the pivoting action about the fulcrum 350, such as by having a taper at an angle 315 that tapers narrower toward the location of the piston 334 to provide a rotational range of motion for the hitch portion 310 within the hitch receiver 302. It should be recognized that the reservoir 332 and piston 334 can be located at any suitable location on the hitch portion 310 and configured to facilitate contact of the piston 334 and the hitch receiver 302 at any suitable location. For example, the reservoir 332 and piston 334 can be located at a forward end of the hitch portion 310, such as near a forward outer edge of the hitch receiver 302. In this case, a fulcrum can be at an end of the hitch portion 310 within the hitch receiver 302.

Additionally, the load measurement device 330 can include a pressure sensor 336 in fluid communication with the reservoir, such as via a conduit 317. The pressure sensor 336 can be configured to indicate a magnitude of the downward force 351 based on the pressure of the fluid. In one aspect, the pressure sensor 336 can include a pressure gage that is calibrated to mechanically indicate, such as with a dial readout, the magnitude of the downward force 351 acting on the hitch ball 307. In another aspect, the pressure sensor 336 can include a transducer configured to output an electrical signal based on the pressure of the fluid. The electrical signal can be received by a processor that can determine the magnitude of the downward force 351 on the hitch ball 307 based on the pressure represented by the electrical signal. The magnitude of the downward force 351 can then be displayed, such as on an electronic display.

Figure 5A:
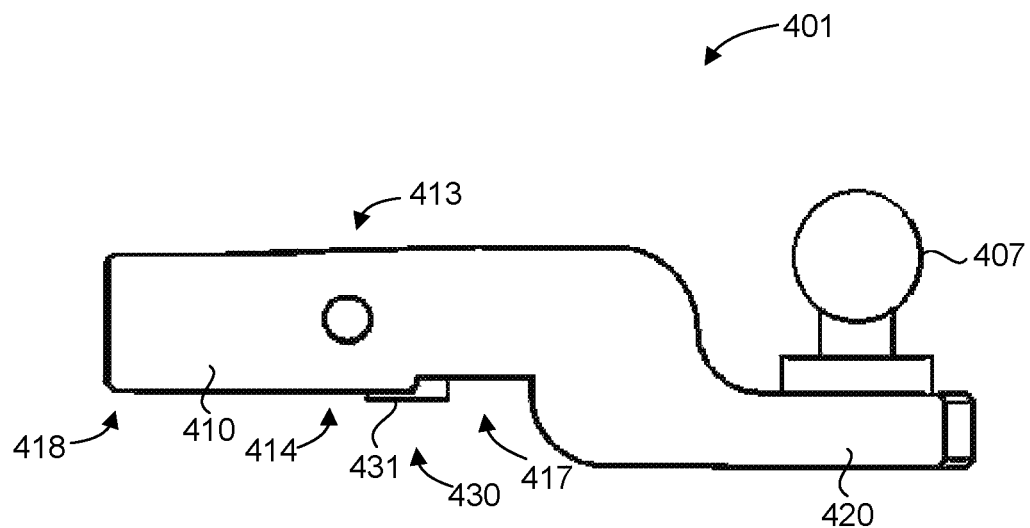
FIG. 5A illustrates a ball mount for measuring tongue weight of a trailer, in accordance with still another example of the present disclosure.

FIG. 5A is a schematic illustration of a ball mount 401 for measuring tongue weight of a trailer, in accordance with still another example of the present disclosure. The ball mount 401 includes some similarities with other ball mounts disclosed herein. For example, the ball mount 401 includes a hitch portion 410 for interfacing with a hitch receiver (omitted for clarity) and a load measurement device 430 associated with the hitch portion 410 and configured to determine a magnitude of a downward force on a hitch ball 407.

In this case, an interface portion 431 of the load measurement device 430 can be located at a bottom side 414 of the hitch portion 410 and can therefore be configured to contact a lower interior surface of the hitch receiver. For example, as shown in the figure, the interface portion 431 can be located at a proximal end 417 of the hitch portion 410 toward a ball portion 420 of the ball mount 401. A fulcrum can therefore be at an end of the hitch portion 410 within the hitch receiver. For example, reference number 450 indicates a location on a top side 413 of a free or distal end 418 of the hitch portion 410 that may form a fulcrum about which the ball mount 401 can pivot when a downward force is applied to the hitch ball 407, thus causing a reaction force to be applied to the interface portion 431 from the hitch receiver in response to the downward force on the hitch ball 407. In one aspect, the interface portion 431 of the load measurement device 430 can act as a fulcrum until the ball mount pivots sufficient to engage or contact an upper interior surface of the hitch receiver at location 450.

Figure 5B:
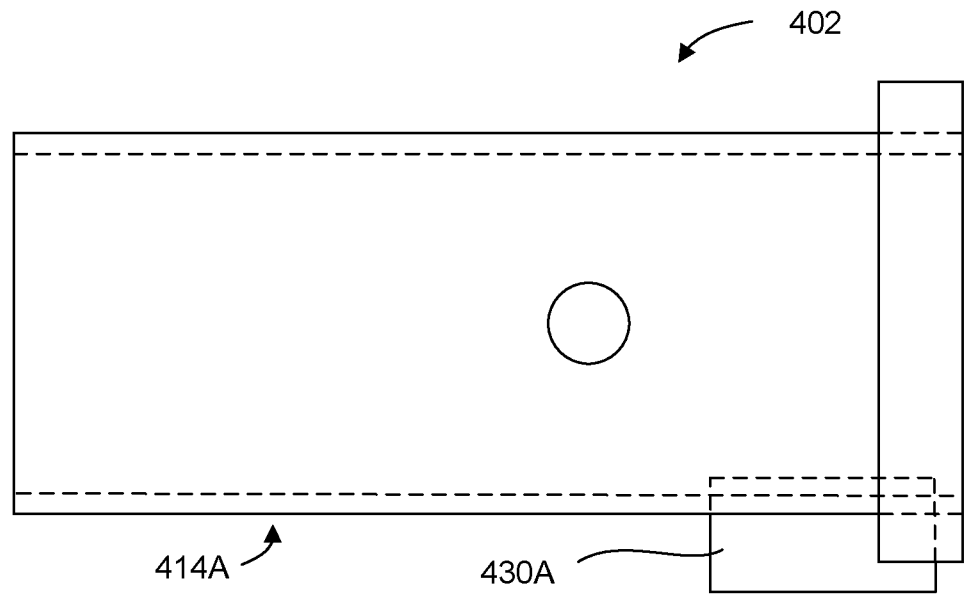
FIG. 5B illustrates a hitch receiver for measuring tongue weight of a trailer, in accordance with another example of the present disclosure.

Alternatively, as illustrated in FIG. 5B, a load measurement device 430A can be operatively coupled with a bottom side 414A of a hitch receiver 402. In this particular embodiment, any standard ball mount, including a mount similar to that illustrated in FIG. 5A (but without a load measurement device) can be used with hitch receiver 402 to generate a load measurement. When a downward force is applied to the hitch ball, the ball mount can pivot, or effectively pivot about the fulcrum and impinge on the load sensor 430A coupled to the hitch receiver 402 to generate a load measurement. Further, the load sensor 430A can be placed in the hitch receiver at nearly any location where it can receive downward force directly or indirectly applied by a ball mount engaged with the receiver. Load measurements can be successfully achieved by operatively coupling the load sensor to either the bottom side of the hitch receiver or the ball mount. The load sensor can further communicate with display or gauge to convey the weight information to a user.

Figure 6A:
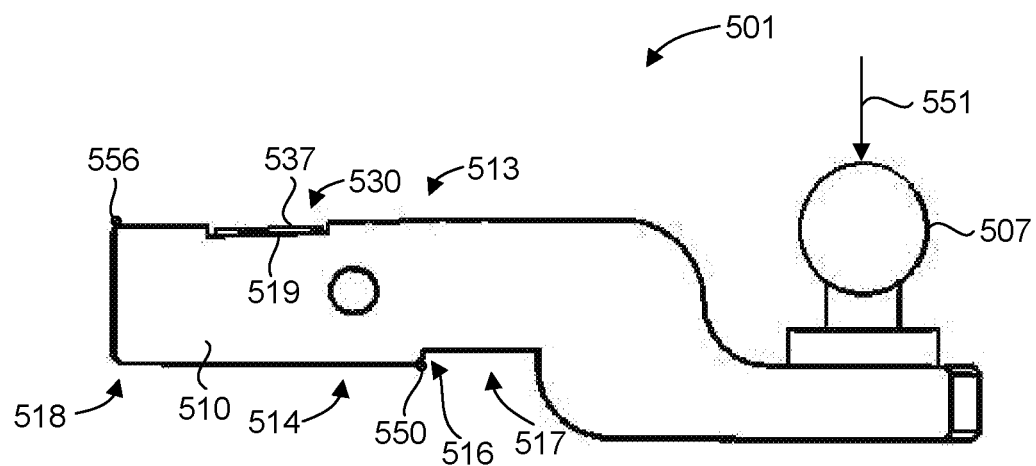
FIG. 6A illustrates a ball mount for measuring tongue weight of a trailer, in accordance with a further example of the present disclosure.

FIG. 6 is a schematic illustration of a ball mount 501 for measuring tongue weight of a trailer, in accordance with a further example of the present disclosure. The ball mount 501 includes some similarities with other ball mounts disclosed herein. For example, the ball mount 501 includes a hitch portion 510 for interfacing with a hitch receiver (omitted for clarity) and a load measurement device 530 associated with the hitch portion 510 and configured to determine a magnitude of a downward force 551 on a hitch ball 507.

In this case, the load measurement device 530 can include a strain gage 537 disposed on a surface 519 of the hitch portion 510. In one aspect, the strain gage 537 can be located on a recessed surface to prevent or minimize the likelihood of damage to the strain gage 537, such as when inserting the hitch portion 510 into and removing the hitch portion 510 from the hitch receiver. In response to the downward force 551 on the hitch ball 507, the ball mount 501 can pivot about a fulcrum 550, such as formed by a fulcrum feature 516, at a bottom side 514 of a proximal end 517 of the hitch portion 510. A top side 513 of a free or distal end 518 of the hitch portion 510 can contact an upper interior surface of the hitch receiver, identified by reference number 550, to resist rotation of the ball mount 501 and induce a load in the hitch portion 510. The strain gage 537 can be configured to measure deformation of the hitch portion 510 at the outer surface 519, which can then be used to determine the downward force on the hitch ball 507 that caused the deformation. Although the strain gage 537 is shown located on an outer surface on a top side 513 of the hitch portion 510, it should be recognized that one or more strain gages can be located on any suitable surface, such as on a bottom, a side, and/or an interior surface of the hitch portion 510.

Figure 6B:
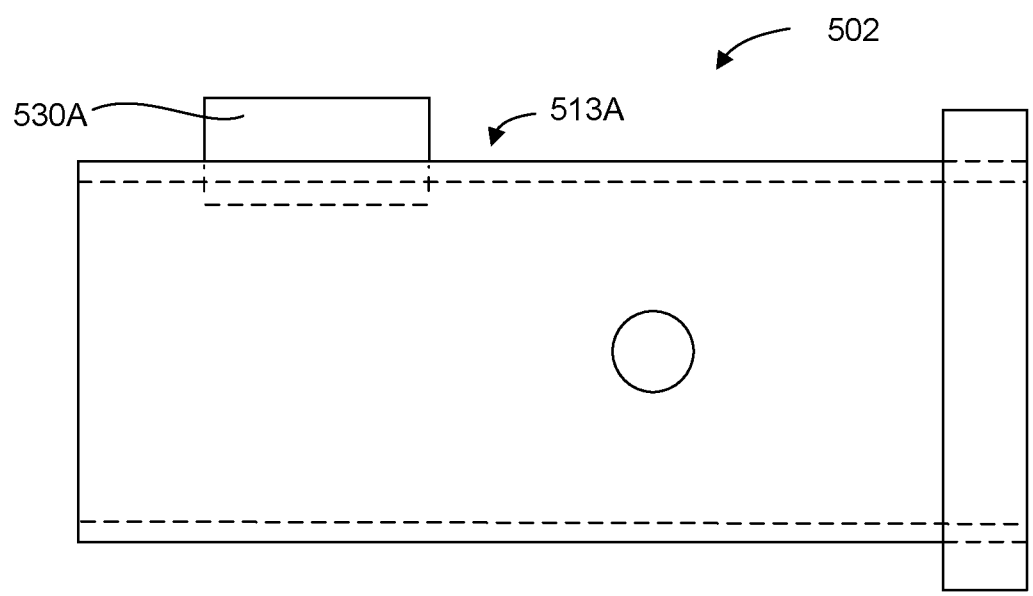
FIG. 6B illustrates a hitch receiver for measuring tongue weight of a trailer, in accordance with another example of the present disclosure.

Alternatively, as illustrated in FIG. 6B, a load measurement device 530A can be operatively coupled with a top side 513A of a hitch receiver 502. In this particular embodiment, any standard ball mount, including a mount similar to that illustrated in FIG. 6A (but without a load measurement device) can be used with hitch receiver 502 to generate a load measurement. When a downward force is applied to the hitch ball, the ball mount can pivot about the fulcrum and impinge on the load sensor 530A coupled to the hitch receiver 502 to generate a load measurement. Thus, load measurements can be successfully achieved by operatively coupling a load sensor to either the top side of the hitch receiver or the ball mount. Again, the load sensor can further communicate with display or gauge to convey the weight information to a user.

Figure 7A:
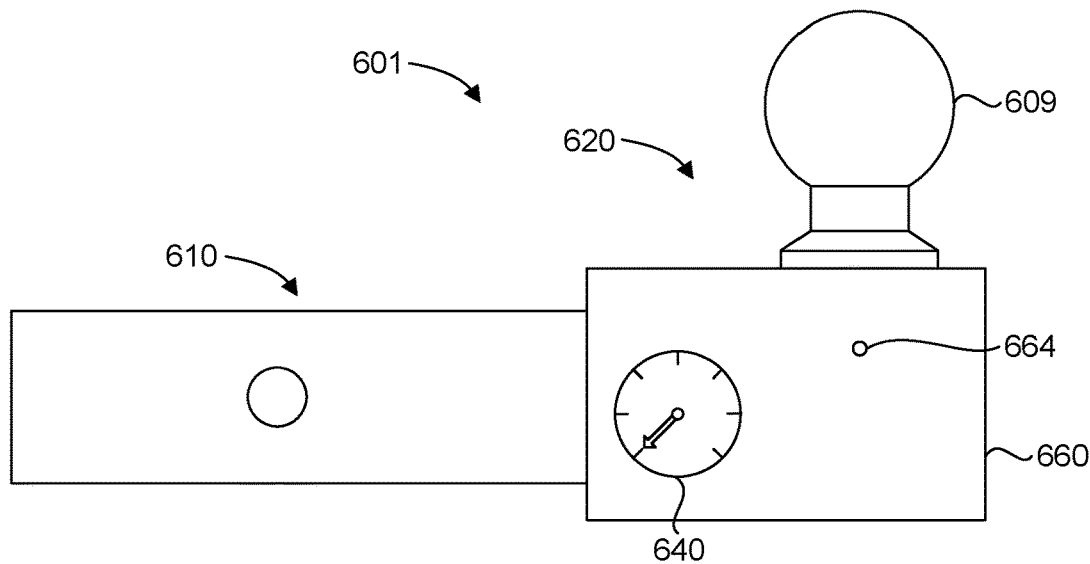
FIGS. 7A and 7B illustrate a ball mount for measuring tongue weight of a trailer, in accordance with another example of the present disclosure.
Figure 7B:
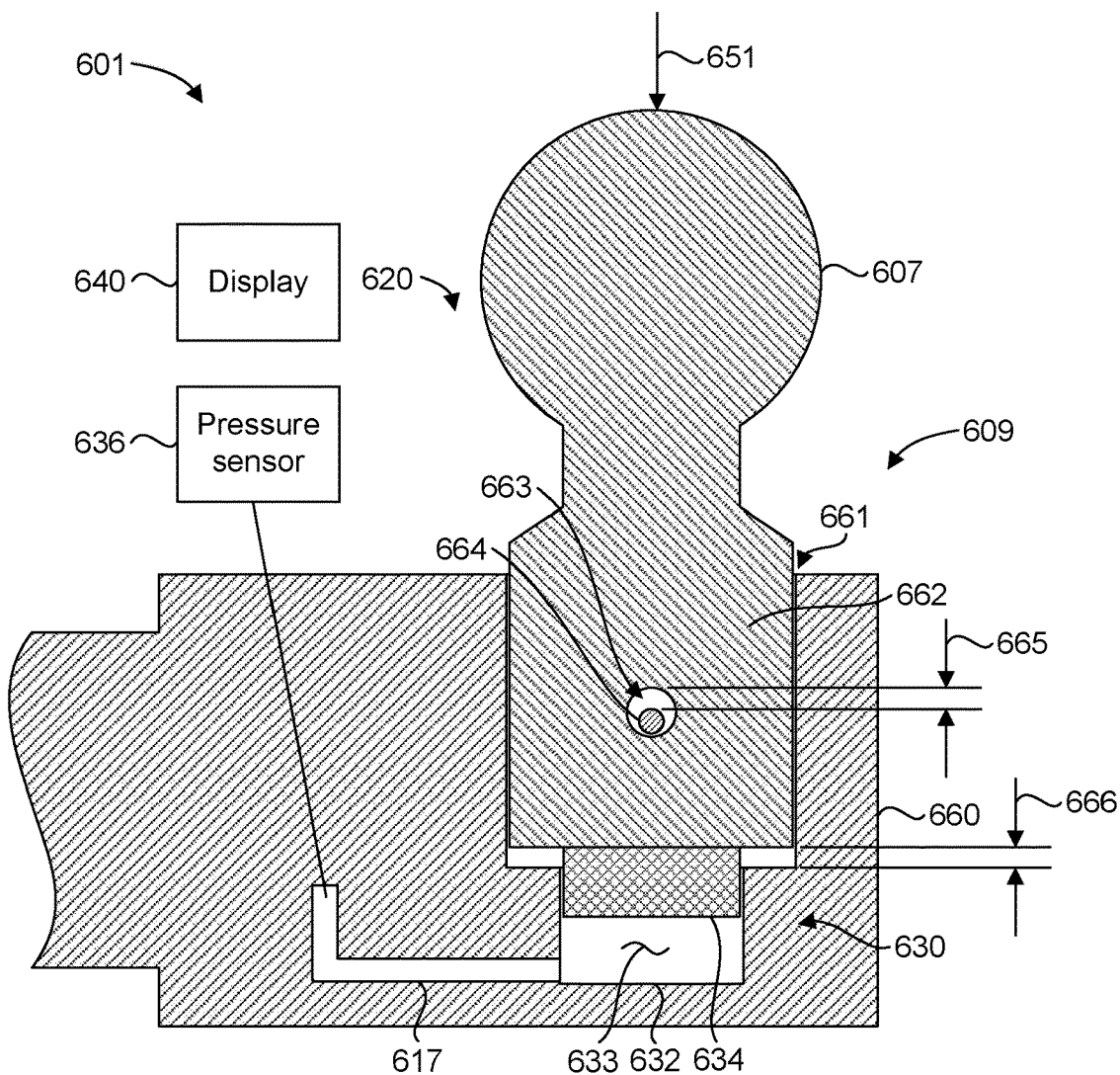

FIGS. 7A and 7B illustrate a ball mount 601 for measuring tongue weight of a trailer, in accordance with another example of the present disclosure. The ball mount 601 includes some similarities with other ball mounts discussed above. For example, the ball mount 601 includes a hitch portion 610 for interfacing with a hitch receiver associated with a vehicle, and a ball portion 620, which can include a hitch ball 607 configured to couple with a tongue of a trailer. The ball mount 601 also includes a load measurement device 630 to determine a magnitude of a downward force 651 on the hitch ball 607. The load measurement device 630 includes a reservoir 632 having a fluid 633 and a piston 634 disposed therein. The piston 634 can affect a pressure of the fluid 633 as a result of the downward load 651 on the hitch ball 607. The load measurement device 630 also includes a pressure sensor 636, or gauge, in fluid communication with the reservoir 632, such as via a conduit 617, to indicate a quantity of the downward load 651 based on the pressure of the fluid. The pressure sensor 636 can be calibrated to indicate a load acting on the hitch ball 607.

In the present embodiment, however, the load measurement device 630 is associated with the ball portion 620. In one aspect, the ball mount 601 includes a trailer tongue weight measuring portion 609 that includes the hitch ball 607 and the load measurement device 630. The hitch ball 607 and the piston 634 are rigidly and mechanically coupled to one another, such that movement of the hitch ball 607 directly causes movement of the piston 634. Thus, the hitch ball 607 is configured to exert a force on the piston 634, thereby affecting a pressure of the fluid 633 in response to the downward force 651 on the hitch ball 607. As a result, there is no need for an interface with a hitch receiver in order to determine the load on the ball portion, as the hitch ball 607 can be configured to move as a result of the load and cause the piston 634 to increase pressure of the fluid 633. In other words, the ball mount 601 can be effective to measure a tongue weight of a trailer independent of a hitch receiver.

With particular reference to FIG. 7B, the ball portion 620 can include a support structure 660. The support structure 660 can define various features of the load measurement device 630 and can interface with and support the hitch ball 607. For example, the support structure 660 can define, at least in part, the reservoir 632 and/or the conduit 617. The support structure can also have a hitch ball opening 661 to receive a lower portion 662 of the hitch ball 607 and facilitate the hitch ball exerting a force on the piston 634. The hitch ball opening 661 can be configured to constrain translational movement of the hitch ball 607 to a single degree of freedom (i.e., parallel to the downward force 651), which can facilitate the hitch ball 607 exerting a force on the piston 634.

In one aspect, the hitch ball 607 can be captured and prevented from unwanted separation from the support structure 660. For example, the hitch ball 607 can have a retention opening 663 in the lower portion 662 that receives a retention pin 664 to facilitate capturing the hitch ball 607 in the hitch ball opening 661. The retention pin 664 can be coupled to the support structure 660. The retention opening 663 and the retention pin 664 can be configured to facilitate movement of the hitch ball 607 against the piston 634 in response to the downward force 651 on the hitch ball. For example, as illustrated in FIG. 7B, an upper clearance 665 between the retention pin 664 and the retention opening 663 can be sized equal to or greater than an extension distance 666 of the piston 634 from the reservoir 632. This can ensure that the retention pin 664 will not hinder downward movement of the hitch ball 607, which could interfere with a proper measurement of the downward force 651 on the hitch ball 607. The shapes and/or sizes of the retention pin 664 and the retention opening 663 can be of any suitable configuration (e.g., cross-sectional shapes that are circular, oval, elliptical, rectangular, etc.) or dimension. In addition, the retention opening 663 and the retention pin 664 can be in any suitable location. Thus, although the location of the retention opening 663 and the retention pin 664 are shown in the figure as being laterally located in a middle portion of the hitch ball 607, it should be recognized that a retention opening and a retention pin can be located at a lateral external surface of the hitch ball 607, such as proximate a wall of the hitch ball opening 661. In one aspect illustrated in FIG. 7A, the retention pin 664 can be accessible from an exterior of the support structure 660 to facilitate removal of the retention pin and, thus, the hitch ball 607. The hitch ball 607 can therefore be interchanged with another hitch ball having a different diameter ball to properly fit a trailer tongue or to replace a damaged hitch ball.

In one aspect, a display 640 for the pressure sensor or gauge can be included to indicate the magnitude of the load or downward force 651. Such a display can be located proximate the pressure sensor 636 or included with a gauge. It should be recognized that a display can be disposed in any suitable location and can be in communication with the pressure sensor via any suitable means. For example, as shown in FIG. 7A, the display 640 can be associated with the ball portion 620. In another example, a transmitter can be included to communicate the magnitude of the downward force 651 on the hitch ball 607 to a remote display.

Figure 8:
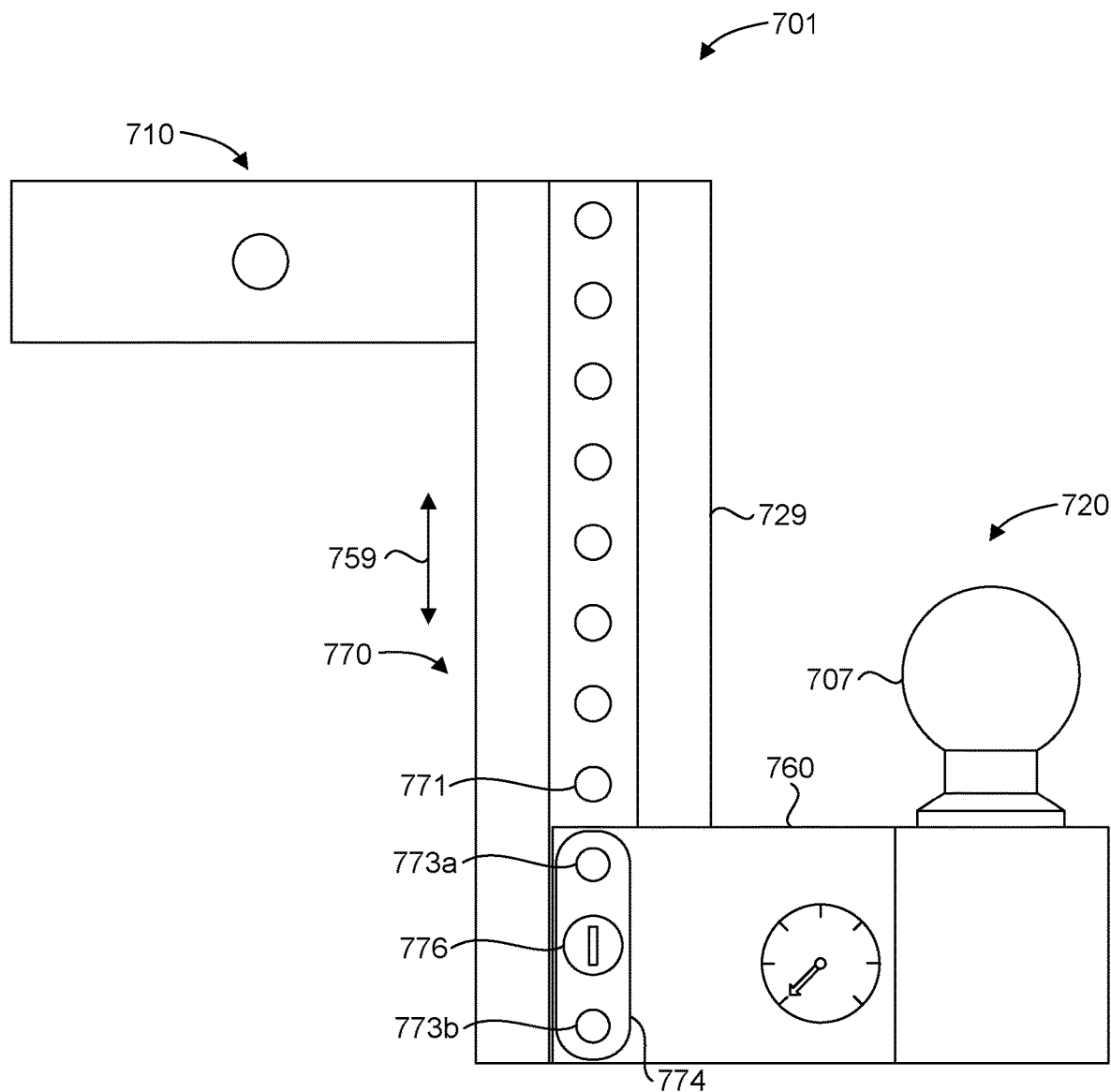
FIG. 8 illustrates a ball mount for measuring tongue weight of a trailer, in accordance with yet another example of the present disclosure.
Figure 9:
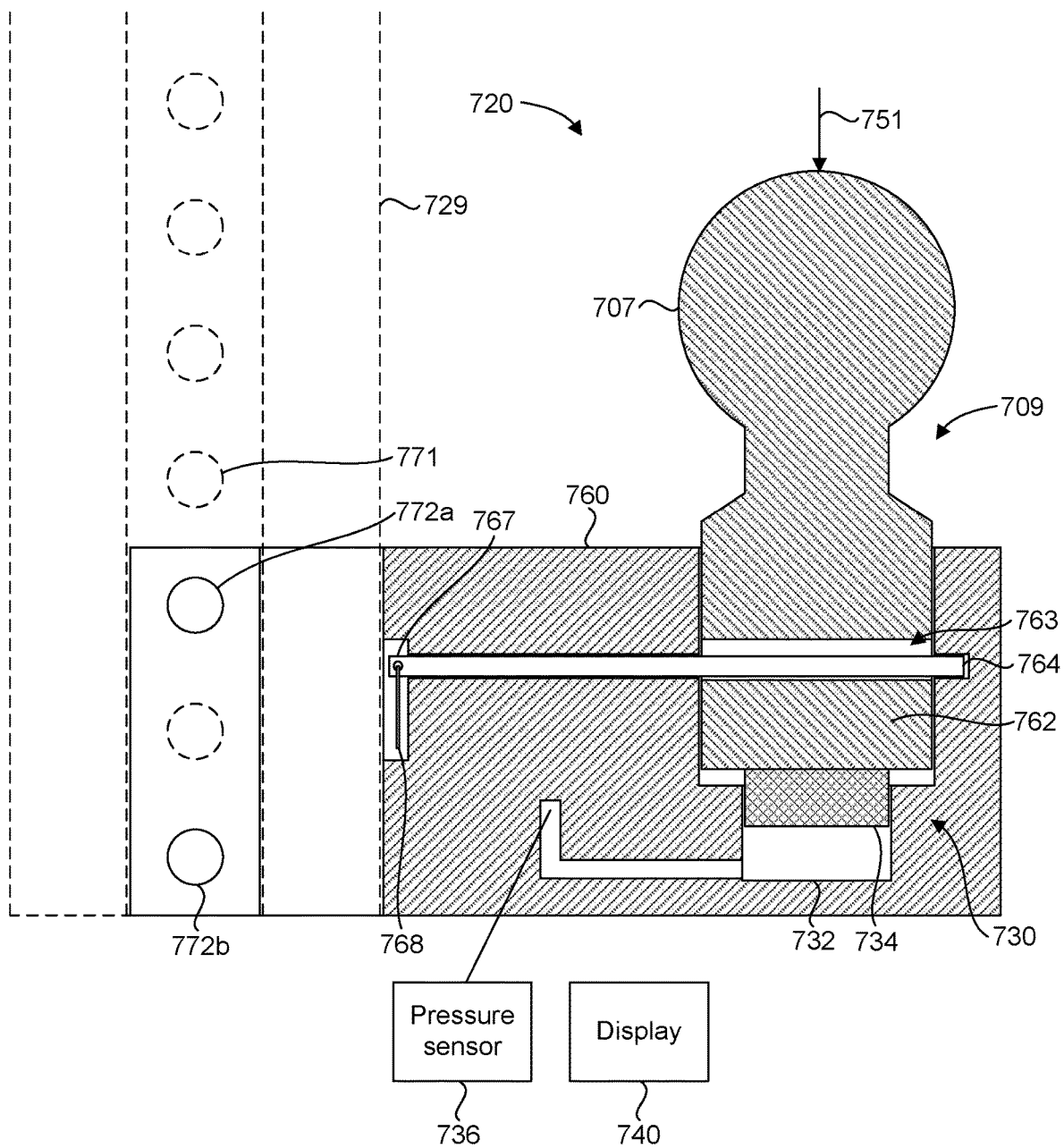
FIG. 9 is a side cross-sectional view of a ball portion of the ball mount of FIG. 8.

FIG. 8 illustrates a ball mount 701 for measuring tongue weight of a trailer, in accordance with yet another example of the present disclosure. The ball mount 701 is similar in many respects with the ball mount 601 of FIGS. 7A and 7B discussed above. For example, the ball mount 701 includes a hitch portion 710 for interfacing with a hitch receiver associated with a vehicle, and a ball portion 720, which can include a hitch ball 707 configured to couple with a tongue of a trailer. As shown in FIG. 9, the ball mount 701 also includes a load measurement device 730 associated with the ball portion 720 to determine a magnitude of a downward force 751 on the hitch ball 707. The load measurement device 730 includes a fluid reservoir 732, a piston 734, and a display 740 to indicate the magnitude of the load or downward force 751 on the hitch ball 707 based on fluid pressure. The ball portion 720 comprises a trailer tongue weight measuring portion 709 that includes the hitch ball 707 and the load measurement device 730. The present embodiment, however, includes features and structure that facilitate a vertical height adjustment of the ball portion 720. These features can be used, for example, to position the hitch ball 707 at a suitable height for engaging a trailer when a hitch receiver on the tow vehicle would otherwise be too high.

With reference to FIGS. 8-10B, the ball mount 701 can include a vertical member 729, coupled between the hitch portion 710 and the ball portion 720, configured to allow adjustment of a height of the ball portion 720 with respect to the hitch portion 710 in direction 759. The ball mount 710 can therefore include multiple separable components in a height-adjustable device. The height of the ball portion 720 can be adjustable with respect to the hitch portion 710 utilizing a height adjustment mechanism 770. The height adjustment mechanism 770 can include height adjustment openings 771 in the vertical member 729. The height adjustment mechanism 770 can also include two or more height adjustment pin openings 772a, 772b in the ball portion 720. In addition, the height adjustment mechanism 770 can include two or more height adjustment pins 773a, 773b removably extendable at least partially through the height adjustment pin openings 772a, 772b in the ball portion 720 and the height adjustment openings 771 in the vertical member 729. In one aspect, the height adjustment pins 773a, 773b can be coupled to one another via a connecting member 774. The connecting member 774 can therefore facilitate simultaneous insertion or removal of the height adjustment pins 773a, 773b.

The use of multiple height adjustment pins 773a, 773b can achieve sufficient strength in a smaller diameter than is possible with only a single pin. The size of the openings 771 in the vertical member 729 can therefore be smaller, which affects the strength of the vertical member 729 and contributes to a smaller cross-section. The use of multiple height adjustment pins 773a, 773b can also reduce relative movement of the ball portion 720 and the vertical member 729, thus contributing to more accurate tongue weight measurements.

In use, the height adjustment pins 773a, 773b can be removed from at least the height adjustment openings 771 in the vertical member 729, and the ball portion 720 can be moved vertically in direction 759. Once a desired height of the hitch ball 707 is achieved, the height adjustment pins 773a, 773b can be inserted into the nearest acceptable adjustment openings 771 through the respective height adjustment pin openings 772a, 772b to fix the relative position of the ball portion 720 and the vertical member 729 and complete the height adjustment of the hitch ball 707.

Figure 10A:
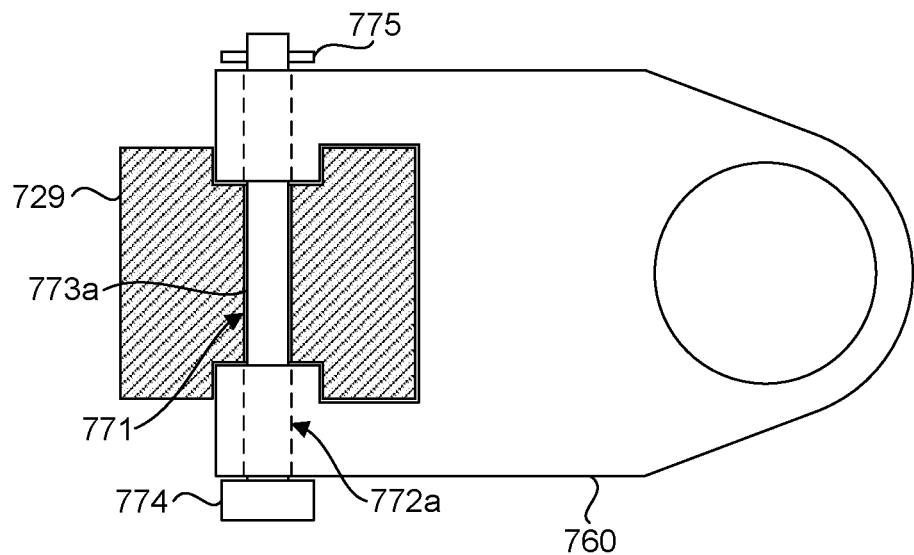
FIG. 10A is a top cross-sectional view of a vertical member of the ball mount of FIG. 8.
Figure 10B:
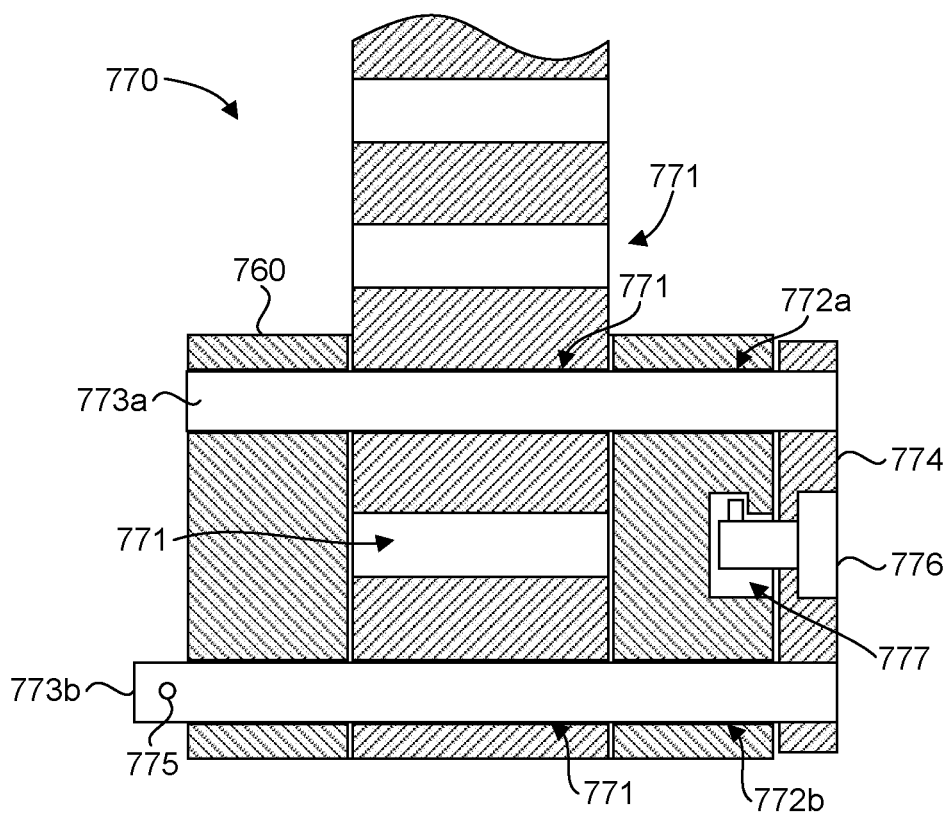
FIG. 10B is a rear cross-sectional view of the ball mount of FIG. 8.

As with the ball mount 601 discussed above, the ball portion 720 of the ball mount 701 can include a support structure 760 that can define various features of the load measurement device 730 and can interface with and support the hitch ball 707. In addition, the support structure 760 can be configured to interface with the vertical member 729. For example, the vertical member 729 and the support structure 760 can be configured with complementary geometries to facilitate a stable engagement of the vertical member 729 and the support structure 760 when coupled to one another via the height adjustment pins 773a, 773b, as discussed above. As shown in FIG. 10A, the vertical member 729 can have an I-shaped cross-section and the support structure 760 (i.e., the ball portion 720) can have a C-shaped cross-sectional portion to mate with and engage at least a portion of the I-shaped cross-section of the vertical member 729. Such an interface configuration can provide torsional stability for mating vertical member 729 and ball portion 720 components of the ball mount 701. In one aspect, the height adjustment pin openings 772a, 772b can be formed in the support structure 760.

The ball mount 701 can also include features and structure to prevent unwanted removal of the height adjustment pins 773a, 773b from the adjustment openings 771 in the vertical member 729 and the height adjustment pin openings 772a, 772b in the ball portion 720. For example, a clip or pin 775 can be secured to an end of a height adjustment pin, such as the pin 773b as illustrated in the figures. In another example, a lock 776 can be associated with the connecting member 774. The ball portion 720 (i.e., the support structure 760) can include a receptacle 777 for the lock 776 that can facilitate securing and releasing the lock 776 to the ball portion 720. This can prevent removal of the height adjustment pins 773a, 773b from the height adjustment pin openings 772a, 772b in the ball portion 720 and the height adjustment openings 771 in the vertical member 729, and thereby preventing unwanted separation of the ball portion 720 from the vertical member 729, which can deter theft of the ball portion 720.

As with the ball mount 601 discussed above, the hitch ball 707 of the ball mount 701 can be captured and prevented from unwanted separation from the support structure 760. As illustrated in FIG. 9, the hitch ball 707 can have a retention opening 763 in a lower portion 662 of the hitch ball 707 that receives a retention pin 764 to facilitate capturing the hitch ball 707. The retention opening 763 and the retention pin 764 can be configured to provide a clearance to facilitate movement of the hitch ball 707 against the piston 734 in response to the downward force 751 on the hitch ball and ensure that the retention pin 764 will not hinder downward movement of the hitch ball 707. As mentioned above, the support structure 760 can be configured to interface with the vertical member 729. In one aspect, the retention pin 764 can be oriented with an end 767 of the pin proximate the vertical member 729, such that the retention pin is hidden from view when the ball portion 720 is coupled to the vertical member. This can provide a "clean" look for the ball mount 701 that is aesthetically pleasing compared to an "exposed" pin. The retention pin 764 can be accessible upon separating the ball portion 720 from the vertical member 729. A ring 768 or other suitable grasping feature can facilitate removal of the pin 764 from the ball portion (i.e., the support structure 760) to replace or interchange the hitch ball 707.

Figure 11:
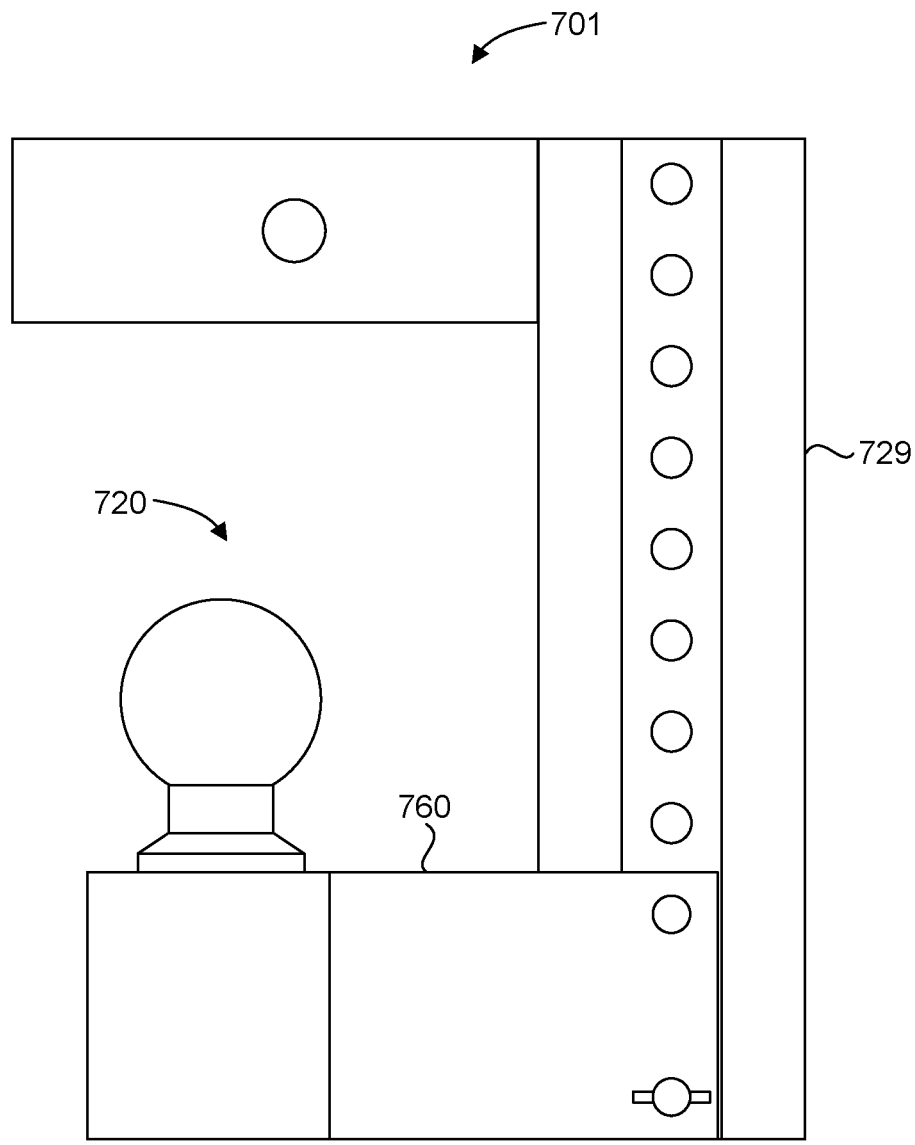
FIG. 11 illustrates the ball mount of FIG. 8 in a storage configuration, in accordance with an example of the present disclosure.

In one aspect, illustrated in FIG. 11, the ball portion 720 can be removed and reversed from its typical towing configuration and coupled to the vertical member 729 in a storage configuration, which can position the ball portion 720 in a more protected location. Such reversibility can be made possible by the interface between the support structure 760 and the vertical member 729, which can be symmetric on opposite (i.e., front and back) sides. For example, the I-shaped cross-section of the vertical member 729 is symmetric on opposite sides, which facilitates "flipping" the ball portion to the opposite side into the storage configuration.

Figure 12:
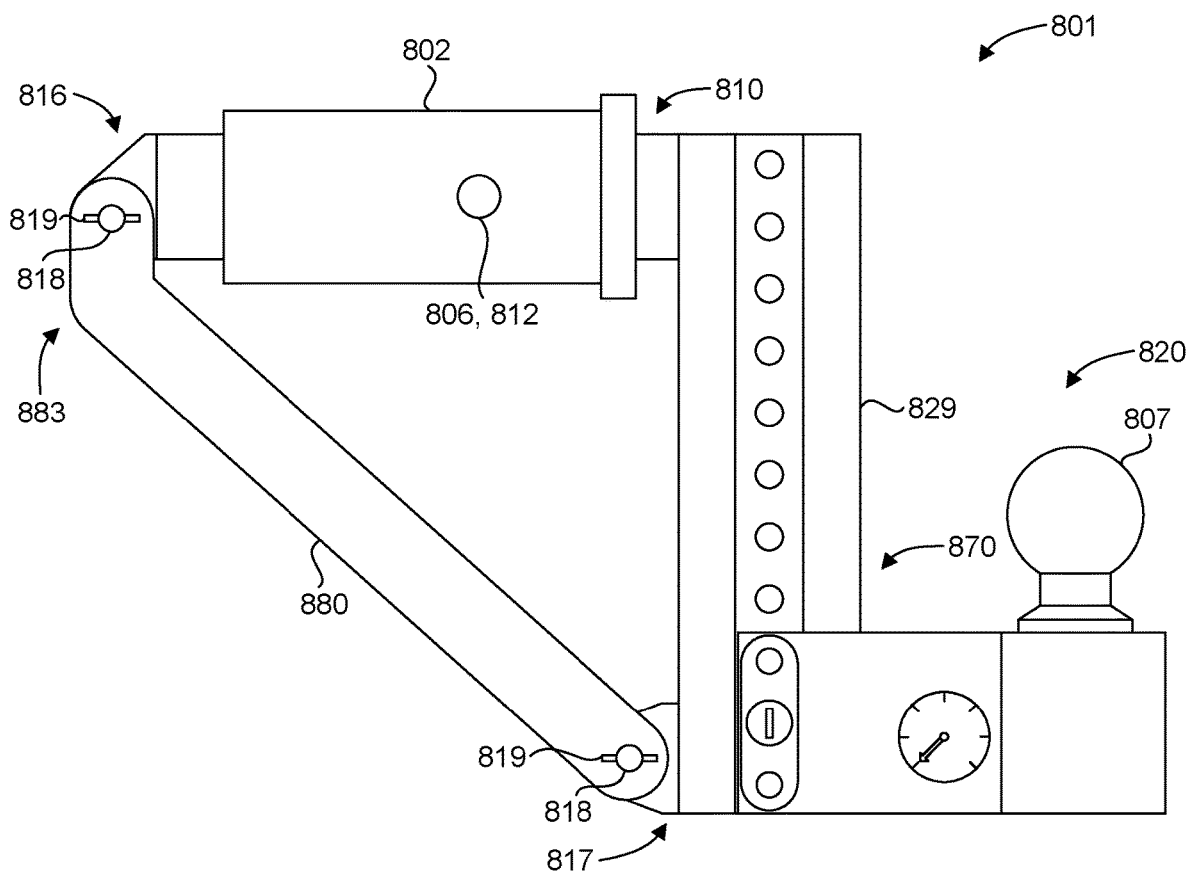
FIG. 12 illustrates a ball mount with a brace in accordance with an example of the present disclosure.

FIG. 12 illustrates ball mount 801 with a brace in accordance with an example of the present disclosure. The ball mount can include a hitch portion 810 for interfacing with a hitch receiver 802 associated with a vehicle. The hitch receiver 802 can be any typical hitch receiver, as discussed above. The hitch portion 810 and the hitch receiver 802 can be coupled or secured to one another in any suitable manner, such as with a pin or threaded fastener through holes 806, 812 in the hitch receiver 802 and the hitch portion 810, respectively. A hitch ball 807 can interface with or otherwise be coupled to the ball portion 820. The hitch ball 807 is configured to couple with a tongue of a trailer. The ball portion 820 can be configured to couple to the hitch ball 807 in any suitable manner, such as with a threaded coupling, a clearance hole for a threaded fastener, or other removably coupling, or with a weld or other a permanent coupling.

In one aspect, the ball mount 801 can include the ability to measure the tongue weight of a trailer to which the ball mount is coupled. Accordingly, features and structures for measuring tongue weight of a trailer can be included, such as a load measurement device associated with the ball portion 820 as discussed hereinabove.

The ball mount 801 can also include a vertical member 829 which connects the hitch portion 810 to the ball portion 820. In one aspect, the vertical member 829 can allow adjustment of the height of the ball portion 820 with respect to the hitch portion 810. Any number of suitable mechanisms for adjusting the height of the ball portion 820 along the vertical member 829 may be used, such as tongue-in-groove, locking pins, etc. For example, as shown in the figure, the ball mount 801 can include a height adjustment mechanism 870, as discussed above with respect to FIGS. 8-11. It should be recognized, however, that the ball portion 820 need not be height adjustable and may be vertically offset by the vertical member 829 and permanently fixed relative to the hitch portion 810.

The ball mount 801 can also include a brace 880 connected between a distal end 816 of the hitch portion 810 and a bottom end 817 of the vertical member 829. The brace 880 can be coupled at each end using any number of mechanisms such as pins, screws, etc. As shown in FIG. 12, the brace 880 is coupled to the hitch portion 810 and the vertical member 829 using pins 818, which can be prevented from unwanted removal by clips or pins 819.

FIG. 12 shows the ball mount 801 engaged with the hitch receiver 802. In use, the hitch portion 810 of the ball mount 801 is engaged with the hitch receiver 802 in a typical manner by sliding the hitch portion 810 through an opening in the hitch receiver 802 until the holes 806, 812 in the hitch receiver 802 and the hitch portion 810, respectively, align with one another. The hitch portion 810 of the ball mount 801 is then secured to the hitch receiver 802 using a standard pin or other fastening mechanism. Once the hitch portion 810 of the ball mount 801 is securely engaged with the hitch receiver 802, the brace 880 can be connected to the distal end 816 of the hitch portion 810. If not already connected to the bottom end 817 of the vertical member 829, such connection can also be made.

Figure 13:
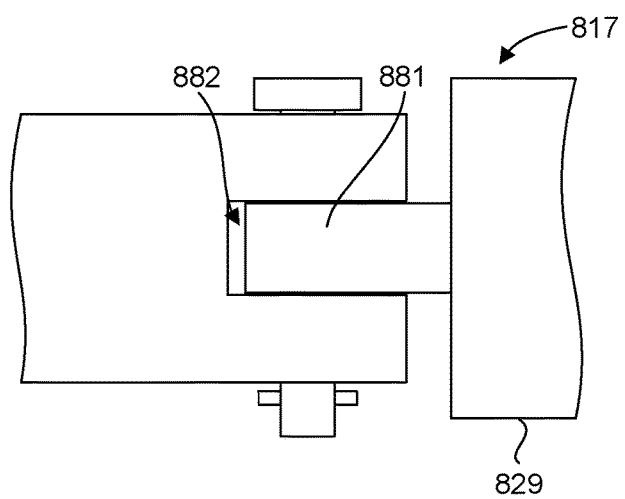
FIG. 13 is a detail view of a coupling of the brace and a vertical member of the ball mount of FIG. 12.

A number of suitable configurations may be used at the bottom end 817 of the vertical member 829 and the distal end 816 of the hitch portion 810 in order to aid in securing the brace 880 thereto. As illustrated in FIG. 13, for example, the bottom end 817 of the vertical member 829 may have a tongue or tenon 881 protruding from a backside thereof. The brace 880 can have a corresponding slot or groove 882 into which the tenon 881 fits, and holes in both pieces can accommodate the insertion of the pins 818, or any other fastener pre-designed for such purpose. Similarly, the distal end 816 of the hitch portion 810 may be narrow to also effectively form a vertically oriented tongue or tenon and allow the brace 880 to engage and couple to the distal end 816 in a similar manner. It should be recognized that the brace 880 can include a tongue or tenon and the hitch portion 810 and/or the vertical member 829 can include a corresponding slot or groove into which the tenon fits. In addition, the brace 880 can have a bend 883 or angle to facilitate attachment to the distal end 816 of the hitch portion 810. The brace 880 can be removable to facilitate removal of the ball mount 801 from the hitch receiver 802.

The brace 880 can stabilize and/or strengthen the ball mount 801 when engaged with the hitch receiver 802 and the tongue of a trailer. While the vertically offset feature provided by the general design of the ball mount 801 is advantageous for accommodating a trailer with a tongue height that differs from the height of the hitch receiver 802, it has been discovered that such designs are comparatively weak and susceptible to potential failure as compared to traditional ball mounts that do not have such vertical offsets. Addition of the brace 880 fortifies the ball mount 801 against over exertion of downward and rearward forces while engaged with and/or pulling a trailer. Although a ball mount type hitch has been illustrated and discussed, it should be recognized that the brace 880 can be utilized with any suitable type of hitch that includes a vertical offset provided by a vertical member, similar to that illustrated in FIG. 12.

In one aspect, the present disclosure can provide a method of measuring tongue weight of a trailer. The method can include obtaining a hitch receiver associated with a vehicle. The method can also include obtaining a trailer having a tongue for coupling the trailer to the vehicle. The method can further include obtaining a ball mount having a ball portion having a hitch ball configured to couple with the tongue of the trailer, a hitch portion for interfacing with the hitch receiver, and a load measurement device associated with the ball portion to determine a magnitude of a downward force on the hitch ball, the load measurement device including a reservoir having a fluid and a piston disposed therein, and a pressure sensor in fluid communication with the reservoir, wherein the hitch ball is configured to exert a force on the piston, thereby affecting a pressure of the fluid in response to the downward force on the hitch ball. The method can still further include engaging the tongue of the trailer with the hitch ball. Additionally, the method can include observing the magnitude of the downward force on a display. In one aspect, the method can further comprise coupling a brace between a distal end of the hitch portion of the ball mount and a bottom end of a vertical member thereof.

Figure 14:
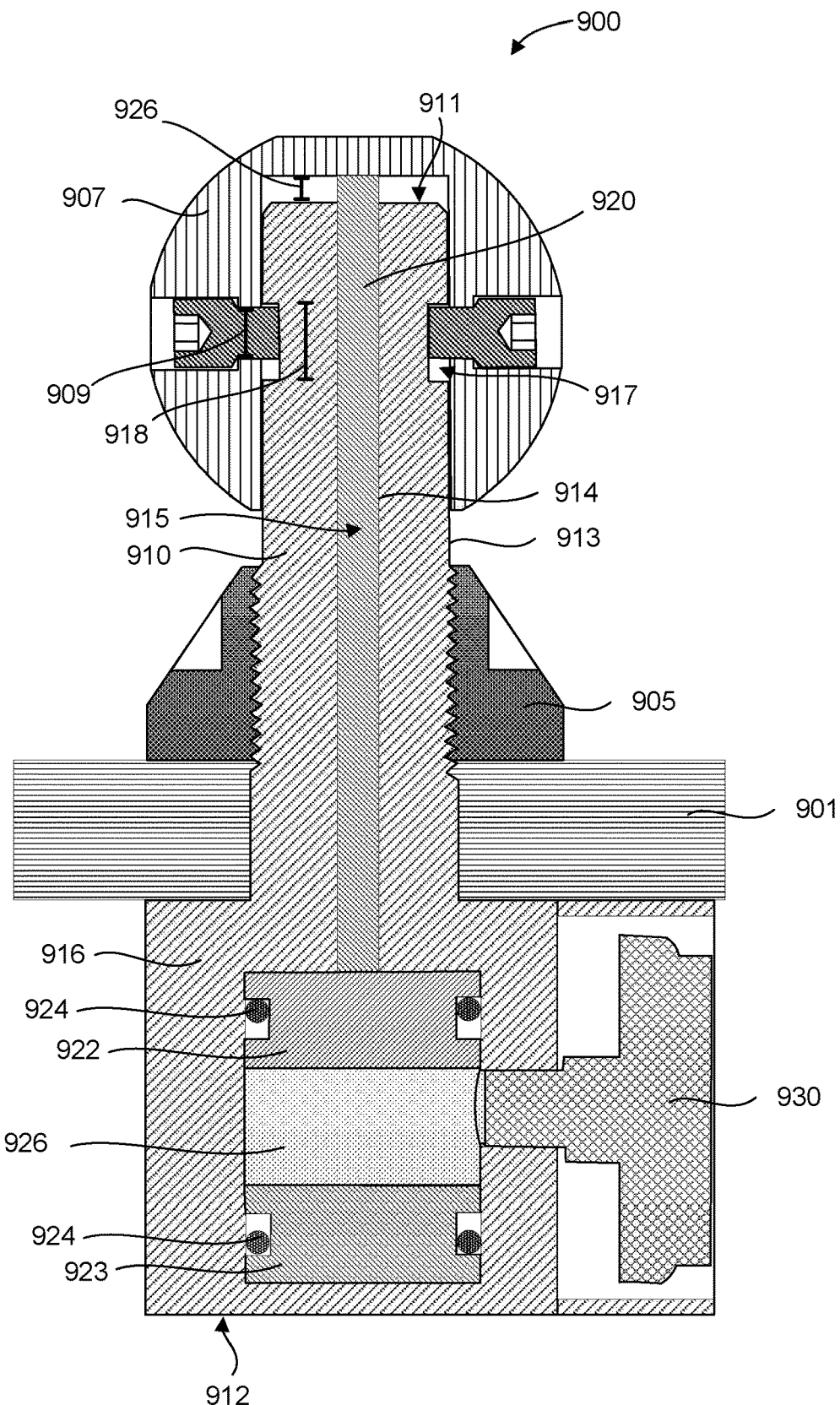
FIG. 14 illustrates a side cross-sectional view of a ball assembly for measuring tongue weight of a trailer, in accordance with an example of the present disclosure.

While there are a number of advantages associated with having a load measurement system associated with a ball mount, it can also be advantageous to have a "universal" load measurement system that can be employed with a generic ball mount. This can be accomplished using a ball assembly that has its own load measurement components/system, independent of the ball mount. An example of a "universal" load measuring ball assembly 900 is illustrated in FIG. 14. The ball assembly 900 has a ball post 910 having a ball end 911, a gauge end 912, an exterior surface 913, and an interior surface 914 opposite the exterior surface 913, the interior surface defining an interior cavity or channel 915.

As previously discussed, the ball post 910 can be securable to a generic ball mount, such as ball mount 901. In this particular example, the ball post 910 is secured to the ball mount 901 between a fastener, such as nut 905, and a load gauge housing 916 formed as part of the gauge end 912 of the ball post 910. A number of other fasteners can also be used to secure the ball post to the ball mount. Non-limiting examples can include a nut, a pin, a screw, a clamp, a clip, the like, and combinations thereof. Other ball post configurations can also be used, as compared to the configuration illustrated in FIG. 14, each of which can be secured to a ball mount using any suitable fastener.

The ball assembly 900 can also have a hitch ball 907 that is slidably coupled to the ball post 910 at the ball end 911. This can be accomplished in a variety of ways. For example, the ball 907 can have an opening or cavity that is configured to accept and engage the ball post 910 at or about the ball end 911. In some embodiments, the exterior surface 913 of the ball post 910 can form or otherwise include a retainer or retention element, such as groove 917, to help retain or effectively temporarily or permanently couple the hitch ball 907 to the ball post 910. Any suitable retainer or retention configuration can be used, including without limitation, one or more holes, a groove, a ridge, a protrusion, or combinations thereof, etc. As can be seen in FIG. 14, the groove 917 can have a vertical dimension (e.g. height or in some perspectives width) 918 that is greater than the diameter 909 of fastener (e.g. screw) 908, so as to allow the screw 908 to couple the hitch ball 907 to the ball post 910 without impeding the slidability of the hitch ball 907 relative to the ball post 910.

While the hitch ball 907 is illustrated in FIG. 14 as being attached to the ball post 910 via a screw 908, any number of fasteners or attachment features can also be used to either permanently or removably attach the hitch ball 907 to the ball post 910. Non-limiting examples of such fasteners or attachment features can include threads, clips, clamps, cam-locks, locking detents, pins, hinges, welds, compression fittings, retention rings, the like, or combinations thereof, among others.

In some examples, a ring (not shown), or similar, can be permanently, but slidably, disposed within a groove, or between ridges or protrusions, of the ball post to facilitate the slidable attachment or coupling of the hitch ball. For example, the hitch ball can be welded, threaded, or otherwise attached to the slidable ring to allow the ball to slide relative to the ball post via the slidable ring.

By maintaining the slidability of the hitch ball 907 relative to the ball post 910, a load transfer element, such as the pin 920 and piston 922 system/components, can be operably associated with both the hitch ball 907 and a load gauge 930 disposed at the gauge end 912 of the ball post 910. This can cause a load measurement to display on the load gauge 930 based upon a load applied to the hitch ball 907. Thus, when a trailer tongue is applied to the hitch ball 907, the hitch ball 907 will slide down along (i.e. relative to) the ball post 910 and engage the pin 920. The load on the hitch ball 907 will drive the pin 920 and piston 922 down to press a hydraulic or pneumatic medium against the load gauge 930 to generate a load measurement based on the load applied to the hitch ball 907. In some examples, a gasket 924 can be used with piston 922 or other pistons to help seal the hydraulic or pneumatic medium within reservoir 926.

Further, the load measurement system can have sufficient resistance and/or back pressure to support the hitch ball 907 above the ball end 911 of the ball post 910 to provide a gap 926 therebetween. This can be accomplished via a component of the load transfer element, such as pin 920, or by a feature/protrusion (not shown) formed on an interior surface of the hitch ball that is insertable within the cavity 915. The protrusion on the hitch ball can extend into cavity 915 to engage another pin, piston 922, or otherwise engage the load transfer element. Thus, in some examples, at least a portion of the load transfer element (i.e. pin 920) can extend out of the ball post 910 at the ball end 911 to provide a gap 926 between the ball end 911 and the hitch ball 907. In other embodiments, a hitch ball having a protrusion formed on and interior surface thereof can extend into the interior cavity of the ball post 910 so as to engage the load transfer element and provide a gap 926 between an interior surface of the hitch ball and the ball end of the ball post.

When a load is applied to the hitch ball 907, the gap 926 will decrease in proportion to the load. If the load is heavier than the ball assembly is configured to accommodate or bare, the inside surface of the hitch ball will abut (e.g. contact) the opposing surface of the ball end 911 of the ball post 910 and the maximum load measurement for that ball assembly will have been reached or exceeded. In some examples, different ball assemblies can be configured to have different weight measuring capacities and/or accuracies within predesignated weight ranges. For example, some ball assemblies can be adapted to have optimal performance with lighter loads, whereas other ball assemblies can be adapted to have optimal performance with medium or heavy loads.

It should be noted that the end of the pin 920 engaging the ball 907, can have a terminal portion with any configuration or design that facilitates engagement or use with the specific structure or design of the ball 907 cavity which engages the ball end 911 of the ball post 910. For example, the pin 920 can terminate in a shape or design, such as a table, head, square, rectangle, circle, triangle, etc. Furthermore, the pin can merely contact or rest against a surface inside the cavity of ball 907, or it can be permanently or removably attached or coupled thereto, for example with threads, pins, welds, etc. In one embodiment the pin and the ball can be integrally formed out of a single piece of metal.

As previously discussed, the gauge end 912 of ball post 910 can form a load gauge housing 916, which can include the load gauge 930. At least a portion of the load transfer element, such as piston 922, can be disposed within the gauge housing 916. Non-limiting examples of portions of the load transfer element that can be disposed and/or retained within the load gauge housing 916 can include a spring, a pin, a portion of a pin, a plunger, a hydraulic piston, a pneumatic piston, the like, and combinations thereof.

A portion of the interior cavity 915 can extend into the load gauge housing 916 to form a fluid reservoir 926 in fluid communication with the load gauge 930. The reservoir 926 can contain at least one of a hydraulic fluid and a pneumatic fluid. Any suitable fluid can be used, such as non-compressible power transfer fluids, compressible fluids, or a combination thereof. Non-limiting examples can include, mineral oil, synthetic oil, polyols such as ethylene glycol, glycerol, glycol ethers, etc., water, phosphate ester fluids, silicone fluids, air, nitrogen, the like, and combinations thereof.

In some examples, an optional second cylinder/piston 923 can be disposed at the bottom of the reservoir 926 to alter/adjust the dimensions of the reservoir 926 and/or to optimize load measurement parameters. Thus, in some examples, a generic reservoir 926 can be formed within the interior cavity 915 of the ball post 910 and different sized secondary pistons 923 can optionally be disposed within the reservoir 926 to alter the reservoir volume for different designs or weight measuring applications. In other examples, the second cylinder 923 can have an adjustment mechanism that can be operated by a user to select the degree of adjustment, for example, the degree to which the second cylinder protrudes into the reservoir thereby affecting the volume thereof.

Figure 15:
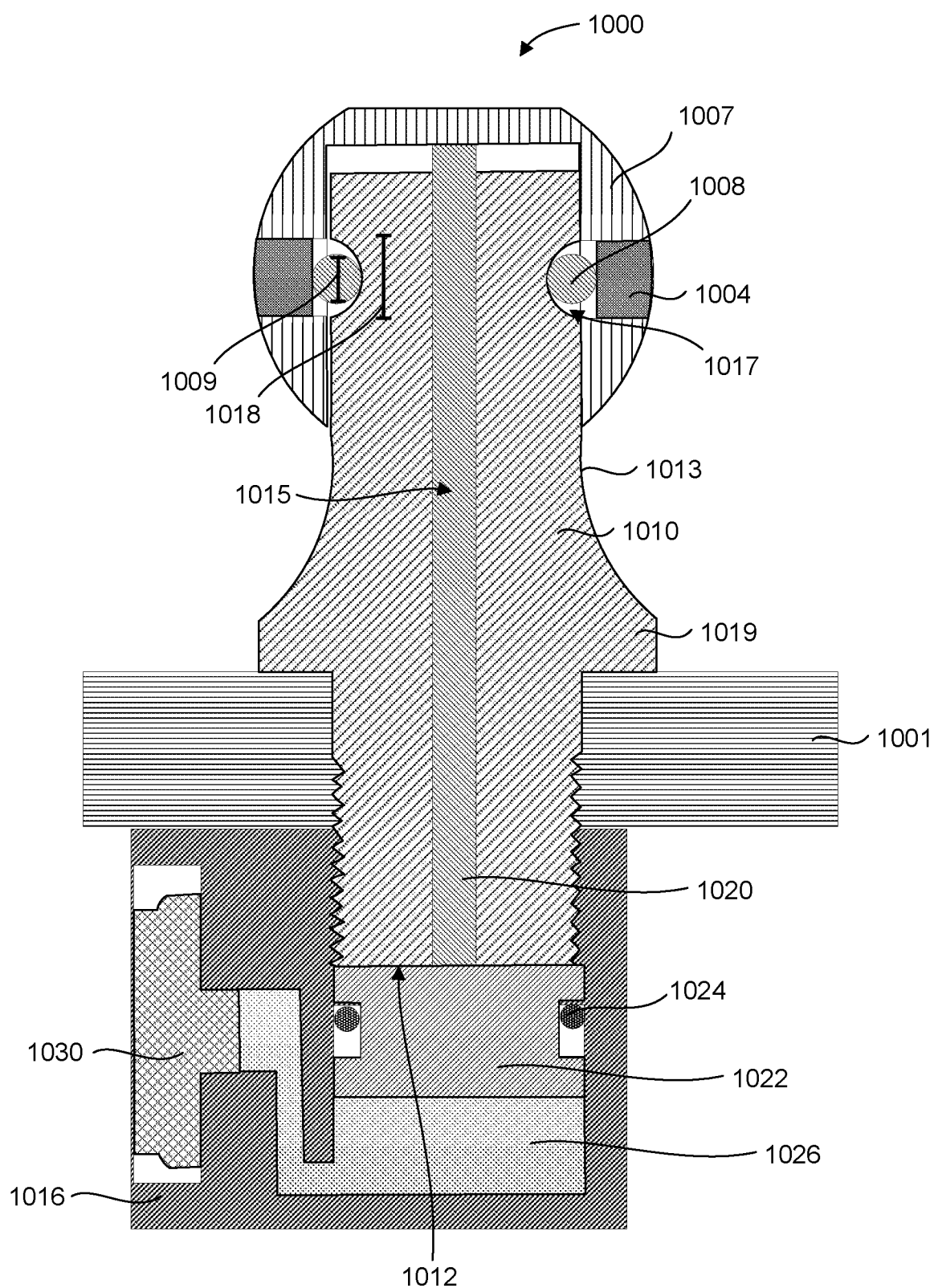
FIG. 15 illustrates a side cross-sectional view of a ball assembly for measuring tongue weight of a trailer, in accordance with an example of the present disclosure.

Another embodiment of a ball assembly is illustrated in FIG. 15. The ball assembly 1000 also has a ball post 1010 similar to ball post 910. However, in this embodiment the gauge end 1012 of the ball post 1010 does not form a load gauge housing, but forms an attachment feature (in this case a threaded feature) to attach a load gauge housing 1016 that includes the load gauge 1030. The load gauge housing 1016 can be attached to the ball post 1010 using a number of features, such as threads, a cam lock, a locking detent, a pin, a screw, a clamp, a clip, the like, and combinations thereof. In this particular embodiment the exterior surface 1013 can form a securing feature, such as ridge or lip 1019, to engage the top side of the ball mount 1001. Other securing features can also be used, such as any combination of ridges, lips, protrusions, and the like. This can facilitate attachment of the ball assembly 1000 to the ball mount 1001 so that the ball mount 1001 is disposed between the securing feature 1019 and the load gauge housing 1016 of the ball assembly 1000.

This particular embodiment uses a plurality of retaining balls 1008 and a retaining spring ring 1004, or the like, to slidably couple the hitch ball 1007 to the ball post 1010. Again the height of the retainer (i.e. slot 1017) is greater than the diameter 1009 of the retaining ball 1008. This allows the hitch ball 1007 to slide relative to the ball post 1010 to depress pin 1020 and piston 1022 to generate a load measurement on the load gauge 1030.

The pin 1020 can be disposed within the interior cavity 1015 of the ball post 1010. When a load is applied to the hitch ball 1007, the pin 1020 engages the piston 1022 in the load gauge housing 1016 to act on the hydraulic or pneumatic medium contained in the reservoir 1026 and press the medium against the load gauge 1030 to generate a load measurement. This embodiment can also include a gasket 1024 associated with piston 1022 to help retain the hydraulic or pneumatic medium within the reservoir 1026. As with other embodiments using a hydraulic or pneumatic medium, any suitable medium can be used and is considered within the scope of the current disclosure.

In contrast to the embodiment illustrated in FIG. 14, the interior cavity 1015 of the ball post 1010 illustrated in FIG. 15 does not form a fluid reservoir. Rather, the interior cavity 1015 can be brought into operable communication with fluid reservoir 1026 formed within the load gauge housing 1016 upon attachment of the load gauge housing 1016 to the ball post 1010. Further, a portion of the load transfer element can be disposed and/or retained within the gauge housing, such as a spring, a pin, a portion of a pin, a plunger, a hydraulic piston, a pneumatic piston, the like of a combination thereof.

It is noted that while FIGS. 14 and 15 illustrate a load transfer element that employs a pin 920/1020 and piston 922/1022 system, other systems can also be used. For example, springs, plungers, pins, pistons (such as hydraulic or pneumatic pistons), rods, electric sensors, the like, or any combination thereof can also be used. Where a pin and plunger/piston system is used, the pin and plunger/piston can be separately or integrally formed. Where the pin and plunger/piston are separately formed, they can be coupled to one another via threads, welds, or the like, or they remain uncoupled.

In some embodiments, a pin, rod, spring, or the like can be part of an electric sensor, such as a strain gauge or piezoelectric sensor. In some examples, the pin, rod, spring, etc. can include a conductive or semi-conductive material that can be compressed to alter an electrical resistance of the pin, rod, spring, etc. from end to end. The change in electrical resistance can be correlated to a load measurement. In other examples, the pressure applied to the pin, rod, spring, etc. can alter a voltage of an electrical charge flowing across the pin, rod, spring, etc. The change in voltage can be correlated to a load measurement. Any other suitable electronic sensor configuration can also be employed.

While the examples illustrated in FIGS. 14-15 each have a load gauge housing associated therewith, a load gauge housing is not always necessary. For example, wires or conduits/channels can form part of the load transfer element to convey an electrical signal or hydraulic fluids to a load gauge and/or display not directly coupled to the ball post. Furthermore, the gauge or display can take any suitable form in view of the selected structure, such as an analog display (e.g. a dial), a digital display or read out, etc. In addition, when electronic components are included, a suitable power source, such as a battery compartment or connecter that allows connection with a powered wiring harness can be used and included with the ball assembly and/or load gauge housing.

The ball assembly can also include a wireless transmitter such that load data pertaining to the magnitude of the downward force on the hitch ball can be wirelessly transmitted to a display. In one aspect, the transmitter can transmit load data to a location remote from the ball assembly, such as to a remote display. For example, the display can be located inside the towing vehicle and can receive load data for display to the driver or operator of the vehicle. The display inside the towing vehicle can be a display integrated with the towing vehicle, such as in the dashboard of the towing vehicle, or it can be separately attachable within the cab of the towing vehicle. In some examples, the transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display can comprise a screen of a mobile device, such as a smartphone or a tablet. Thus, the load data can be communicated to any suitable location, in or out of the vehicle. It should therefore be recognized that the display can be disposed in any suitable location and can be in communication with the load measurement device via any suitable connection, whether physical or wireless.

The "universal" load measurement ball assembly can be configured to measure a tongue weight of any suitable trailer. As such, a method of measuring tongue weight of a trailer is described herein. The method can include engaging the tongue of the trailer with a "universal" ball assembly as described herein. The method can also include securing the ball assembly to a ball mount in any suitable manner, such as methods of attachment described above. Furthermore the ball assembly can be configured with specific exterior shapes, features, or portions that allow the assembly to be secured to a ball mount using traditional tools, such as wrenches, pliers, etc.

As described above, in some examples, the hitch ball can be removably coupled to the ball post. A removable hitch ball can be advantageous for measuring tongue weight using a ball assembly as described above, or for merely coupling a trailer to a towing vehicle. As will be apparent to one skilled in the art, trailer tongues have a variety of sizes and can require differing hitch ball sizes to securely couple a trailer to a towing vehicle. Some standard hitch ball sizes can include 1⅞", 2", 2 5/16", and 3" diameters. Thus, rather than removing the entire ball assembly it can be advantageous to simply replace or adjust the hitch ball itself to accommodate a different sized trailer tongue.

Figure 16:
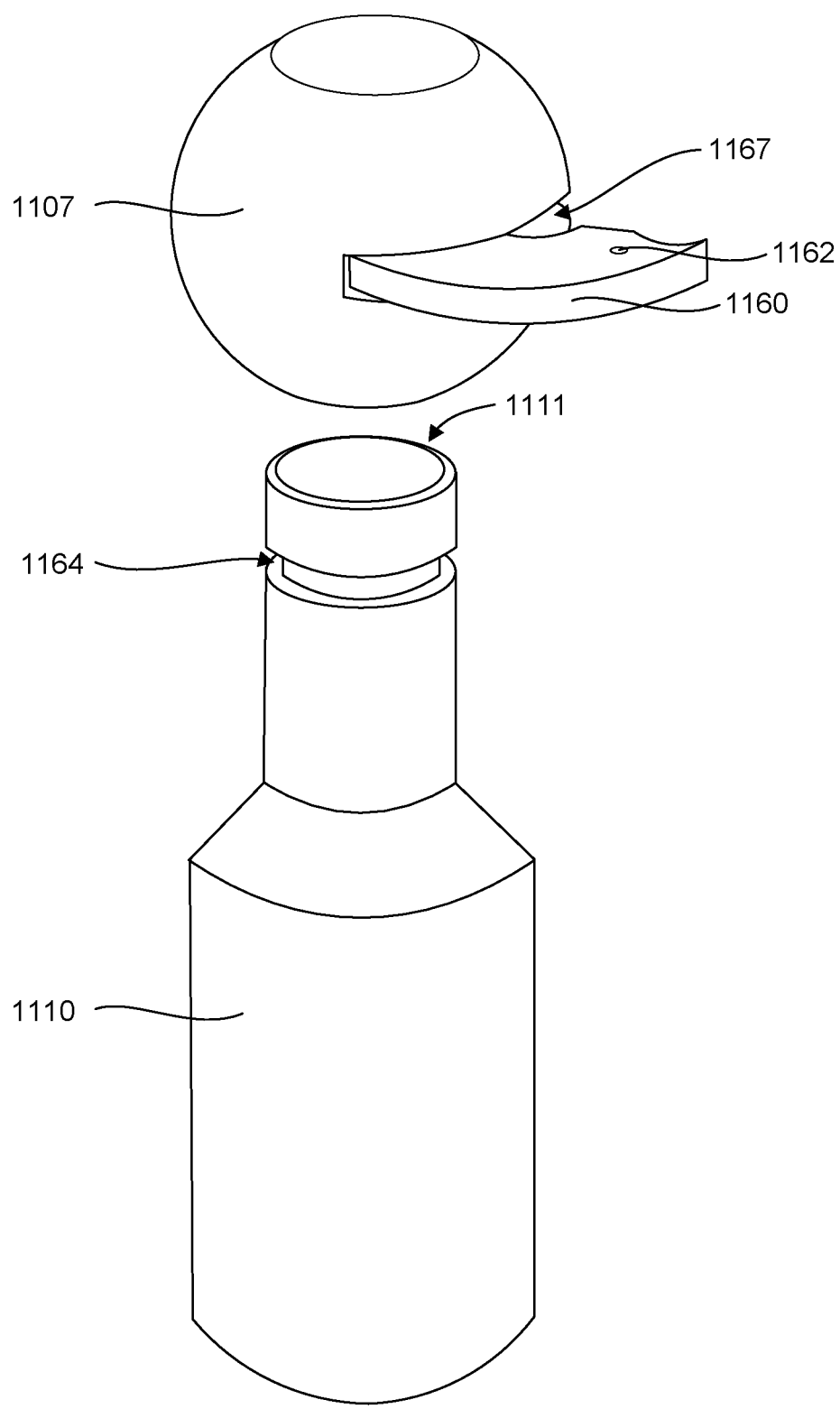
FIG. 16 illustrates a perspective view of a removable hitch ball and an associated ball post, in accordance with an example of the present disclosure.
Figure 17A:
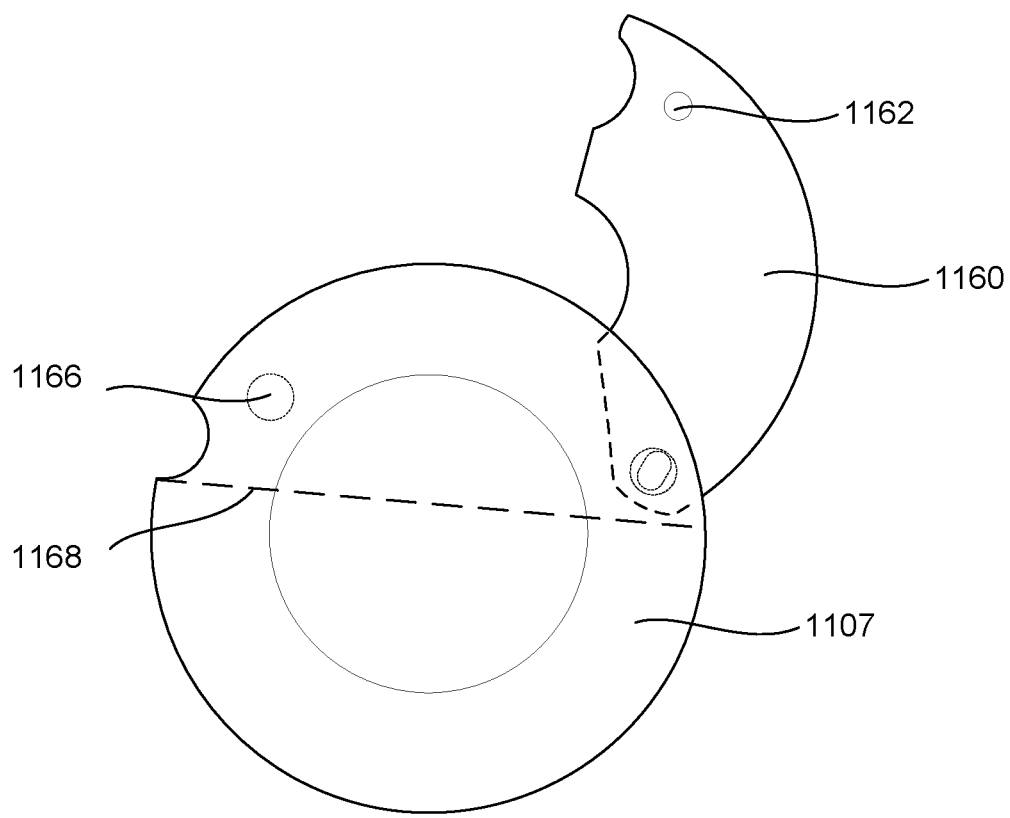
FIGS. 17A-17B illustrate a top view of the removable hitch ball of FIG. 16, in accordance with an example of the present disclosure.
Figure 17B:
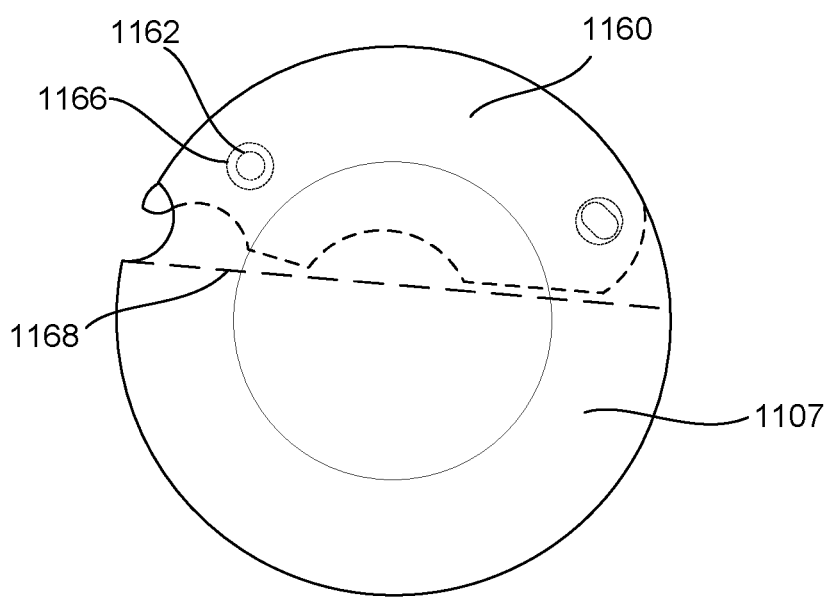

FIG. 16 illustrates one example of a removable hitch ball 1107 that has a hitch ball body that is removably attachable to a ball end 1111 of a ball post, such as ball post 1110. The hitch ball 1107 has a cam plate 1160 having a locking detent feature 1162 associated therewith. Once the hitch ball 1107 is positioned on the ball post 1110, the cam plate 1162 is configured to pivot into recess 1167 of the hitch ball 1107 to engage cam groove 1164 on the ball post 1110 to secure the removable hitch ball 1107 to the ball post 1110. This is further illustrated in FIGS. 17A-B. FIG. 17A illustrates the removable hitch ball 1107 having cam plate 1160 in an open position. As previously described, the cam plate 1160 has a locking detent feature 1162, which is configured to mate with a locking detent feature 1166 disposed within recess 1167 bounded by line 1168. FIG. 17B illustrates the removable hitch ball 1107 in a closed position where the cam plate 1160 has been secured within the recess 1167 and the locking detent features 1162 and 1166 have engaged one another to secure the cam plate within the recess 1167 and secure the hitch ball 1107 to the ball post 1110. Further, when a trailer tongue is positioned over the hitch ball 1107, the trailer tongue will additionally secure the cam plate 1160 within the recess 1167 to engage the cam groove 1164 on the ball post 1110. This can facilitate quick and easy attachment and removal of a number of different sizes of hitch balls without having to remove the ball post or ball assembly.

Figure 18A:
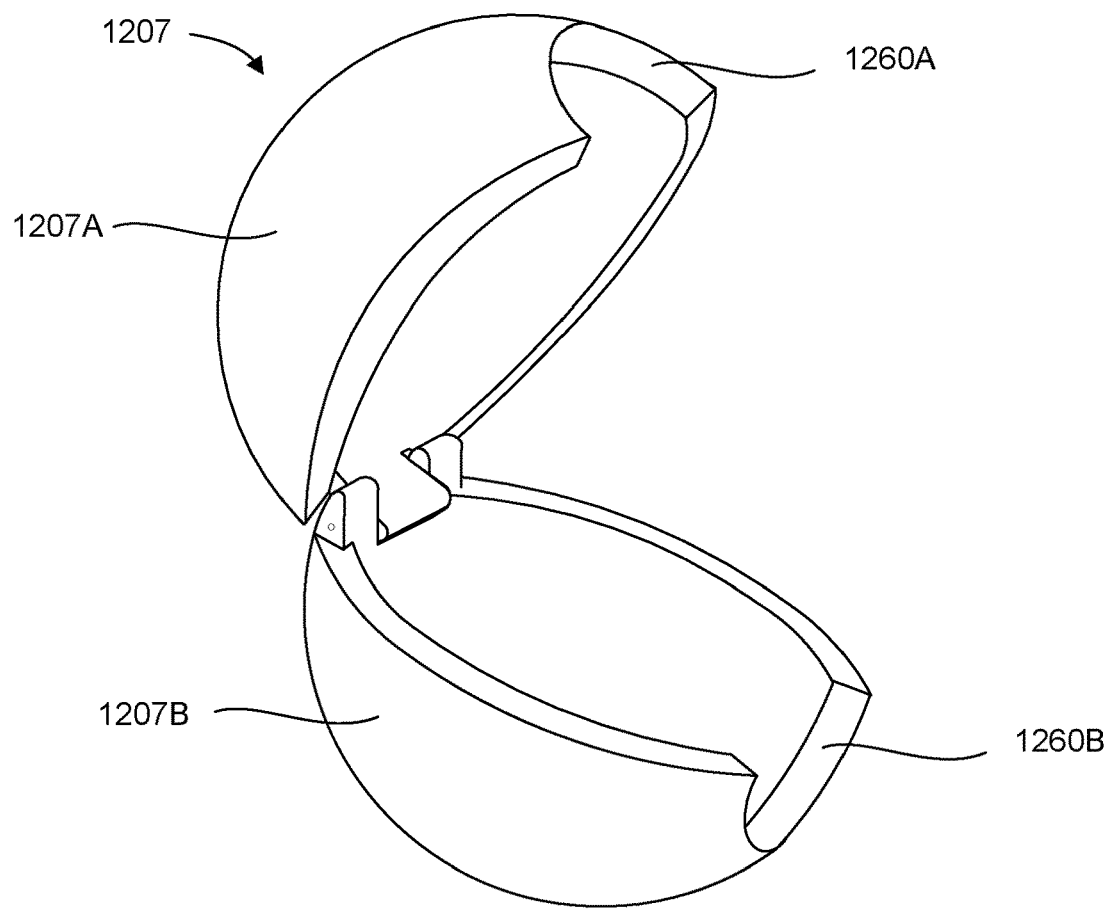
FIGS. 18A-18B illustrate a perspective view of a removable hitch ball, in accordance with an example of the present disclosure.
Figure 18B:
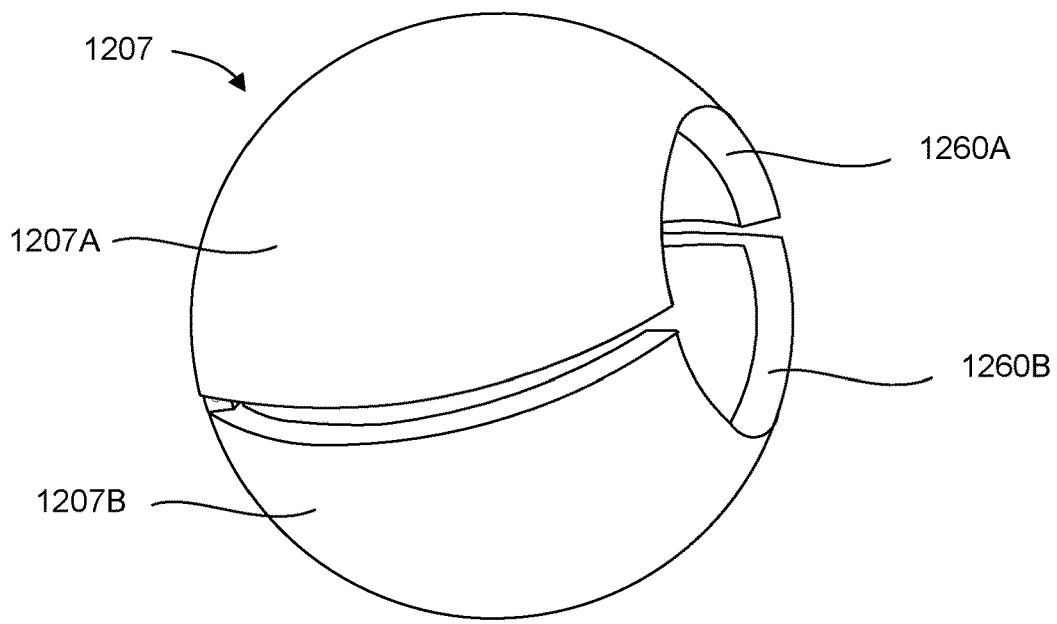

An alternative embodiment of a removable hitch ball is illustrated in FIGS. 18A-B. Hitch ball 1207 employs a clam-shell type body having a plurality of hinged segments 1207A, 1207B. While only two hinged segments are illustrated in these figures, additional hinged segments can also be used. The hinged segments 1207A and 1207B can pivot relative to one another to an open configuration, as illustrated in FIG. 18A, and a closed configuration, as illustrated in FIG. 18B.

Thus, hitch ball 1207 can be used with a variety of ball posts, such as ball post 1110 illustrated in FIG. 16. When engaged with a ball post such as ball post 1110 having a cam groove 1164, the lips 1260A and 1260B of the plurality of hinged segments 1207A, 1207B can engage the cam groove 1164 upon closing the hitch ball 1207 to secure the hitch ball 1207 to the ball post 1110. In some examples, torsional springs or the like can be used to bias the hinge ball 1207 toward a closed position. In other examples, clips, pins, magnets, hooks, screws, bands, locking detents, cam locks, the like, and combinations thereof can also be used to secure the hitch ball 1207 in a closed position. However, in some examples, mere application of the trailer tongue to the hitch ball 1207 can maintain the hitch ball 1207 in a closed position.

It is noted that while FIGS. 18A-B illustrate the hinged segments 1207A and 1207B as being hollowed out, these segments need not be completely hollowed out. Portions of the hinged segments can remain filled in to provide additional structural integrity to the hitch ball 1207, depending on the type of ball post to which the hitch ball 1207 is configured to be attached.

In other examples, the hitch ball 1207 can be configured to attach to a ball-shaped ball end of the ball post to increase the diameter of the ball-shaped ball end of the ball post. For example, the hitch ball 1207 can be configured for attachment to a standard hitch ball, such as a 1⅞" or 2" hitch ball, to increase the diameter of the hitch ball to accommodate a larger trailer tongue. The hitch ball 1207 can also be configured to nest with a number of other similar removable hitch balls.

It is noted that in addition to the attachment features illustrated in FIGS. 16-18B, other attachment features can also be employed to secure the removable hitch ball to a ball post. Non-limiting examples can include threads, clips, clamps, cam-locks, locking detents, pins, screws, hinges, the like, or combinations thereof.

Figure 19:
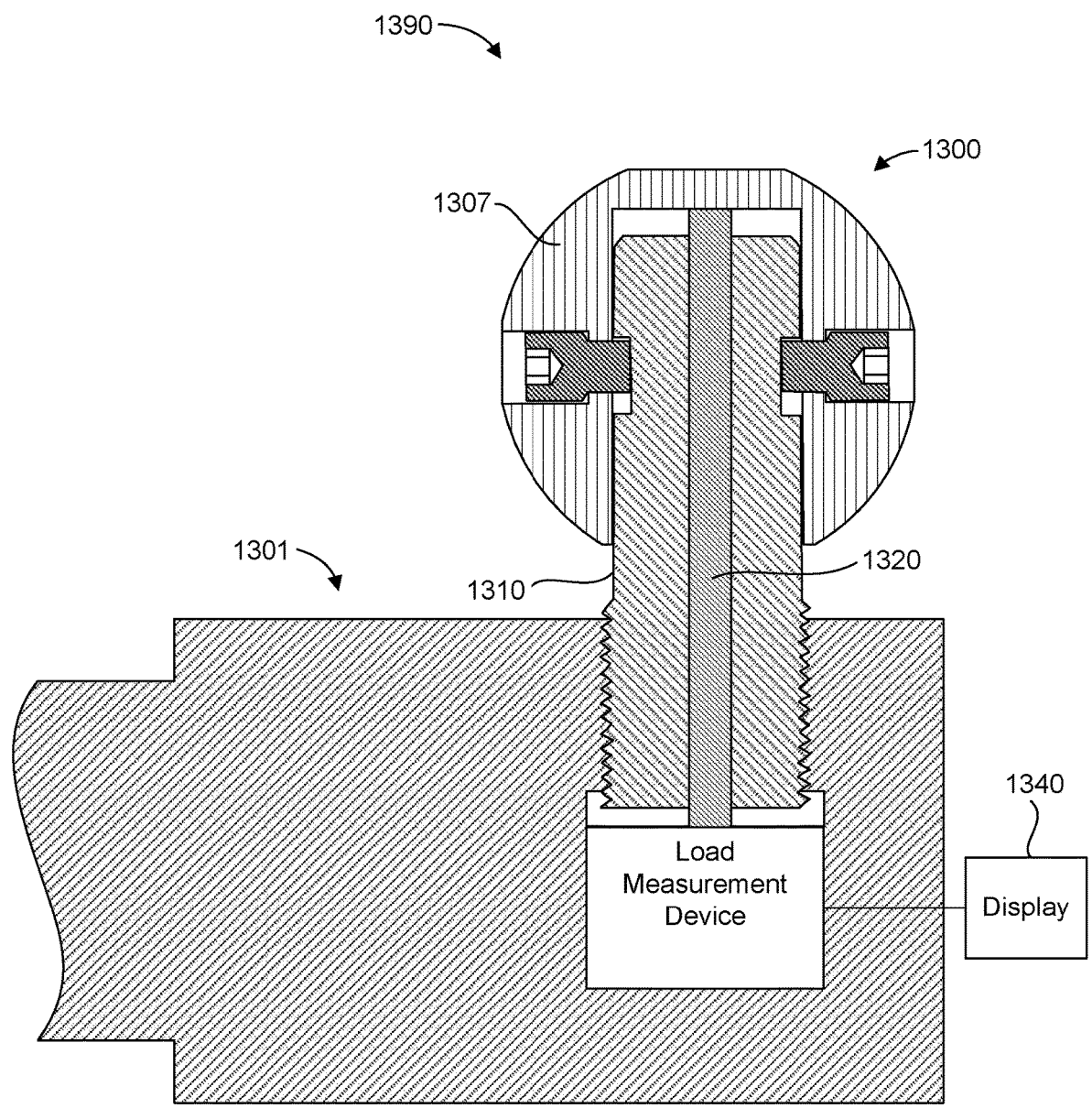
FIG. 19 illustrates a side cross-sectional view of a ball system for measuring tongue weight of a trailer, in accordance with an example of the present disclosure.

FIG. 19 illustrates a load measuring ball system 1390 in accordance with an example of the present disclosure. The load measuring ball system 1390 can include a ball assembly 1300 coupled to and supported by a ball mount 1301. The ball assembly 1300 can include a ball post 1310 and a hitch ball 1307 that is slidably coupled to the ball post 1310. The ball post 1310 can be securable to the ball mount 1301 in any suitable manner (e.g., via a threaded coupling). Typically, the ball post 130 will be fixed in a downward direction relative to the ball mount 1301. A load transfer element, such as a pin 1320, can be operably associated with the hitch ball 1307. The ball post 1310, the hitch ball 1307, and the load transfer element (e.g., the pin 1320) can be similar to those described above with respect to FIGS. 14 and 15. In this case, the ball mount 1301 includes a load measurement device 1330, and the pin 1320 can be operably associated with the load measurement device 1330 of the ball mount such that downward force applied to the hitch ball 1307 acts on the pin 1320 causing the pin to exert force on the load measurement device 1330. The load measurement device 1330 can comprise any suitable type of load measurement device or mechanism (e.g., a load sensor, a load cell, a pressure sensor, etc.). In some embodiments, the load measurement device 1330 can include a piston, a hydraulic medium (e.g., a fluid), and a pressure sensor or a load gauge as described in several examples hereinabove (e.g., with respect to FIGS. 4, 7A, 7B, 9, 14, and 15). Thus, the load measuring ball system 1390 can have load measurement components/system associated with both the ball assembly 1300 and the ball mount 1301 as opposed to such components being isolated in a load measuring ball mount or a load measuring ball assembly. The load measuring ball system 1390 can also include a display 1340 as described herein configured to indicate the magnitude of the downward force, as determined by the load measurement device 1330. In some embodiments, a display can be associated with a load gauge that both measures and displays a load.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A ball assembly, comprising:
    a ball post having a ball end, a gauge end, an exterior surface, and an interior surface opposite the exterior surface, the interior surface defining an interior cavity, the ball post being securable to a ball mount operable to couple with a hitch receiver of a vehicle;
    a hitch ball slidably coupled to the ball post at the ball end, wherein the hitch ball is disposed about at least a portion of the exterior surface of the ball post;
    a load gauge housing coupled to the ball post at the gauge end;
    a load gauge disposed in the load gauge housing;
    a fluid reservoir having a fluid comprising at least one of a hydraulic fluid and a pneumatic fluid in fluid communication with the load gauge; and
    a load transfer element operably associated with both the hitch ball and the load gauge so as to cause a load measurement to display on the load gauge based upon a load applied to the hitch ball, and wherein at least a portion of the load transfer element is disposed within the interior cavity.

2. The ball assembly of claim 1, wherein a portion of the exterior surface of the ball post forms a securing feature to engage the ball mount and facilitate attachment of the ball post to the ball mount.

3. The ball assembly of claim 2, wherein the securing feature is selected from the group consisting of a ridge, a lip, a protrusion, and combinations thereof.

4. The ball assembly of claim 1, wherein at least a portion of the load transfer element is disposed within the ball mount.

5. The ball assembly of claim 4, wherein the portion of the load transfer element disposed within the ball mount is selected from the group consisting of a pin, a plunger, a hydraulic piston, a pneumatic piston, and combinations thereof.

6. The ball assembly of claim 1, wherein the exterior surface of the ball post forms a retainer to facilitate retention of the hitch ball to the ball post.

7. The ball assembly of claim 6, wherein the retainer is selected from the group consisting of a groove, a hole, a lip, a protrusion, and combinations thereof.

8. The ball assembly of claim 1, wherein the hitch ball is permanently coupled to the ball post.

9. The ball assembly of claim 1, wherein the hitch ball is removably coupled to the ball post.

10. The ball assembly of claim 9, wherein the hitch ball is removably coupled to the ball post via at least one of threads, clips, clamps, cam-locks, locking detents, pins, screws, hinges, and combinations thereof.

11. The ball assembly of claim 1, wherein the load transfer element is selected from the group consisting of a spring, a pin, a plunger, a hydraulic piston, a pneumatic piston, an electric sensor, and combinations thereof.

12. The ball assembly of claim 1, wherein at least a portion of the load transfer element extends out of the ball post at the ball end to provide a gap between the ball end of the ball post and the hitch ball.

13. The ball assembly of claim 1, further comprising a wireless transmitter to wirelessly transmit load measurements to a remote display.

14. The ball assembly of claim 13, wherein the remote display is a display associated with a towing vehicle.

15. The ball assembly of claim 13, wherein the remote display is a mobile device.

16. A method of measuring tongue weight of a trailer, comprising:
    engaging the ball assembly of claim 1 with a ball mount configured to couple to a vehicle; and
    engaging a tongue of a trailer with the ball assembly.

17. The ball assembly of claim 1, wherein at least a portion of the load transfer element extends into the load gauge housing.

18. The ball assembly of claim 1, wherein a portion of the load gauge housing forms a securing feature to engage the ball mount and facilitate attachment of the ball post to the ball mount.

19. The ball assembly of claim 1, further comprising a fastener configured to engage the exterior surface of the ball post and facilitate attachment of the ball post to the ball mount.

20. The ball assembly of claim 13, further comprising a power source.

* * * * *